(12) United States Patent
Miyahara et al.

(10) Patent No.: US 6,314,213 B1
(45) Date of Patent: *Nov. 6, 2001

(54) IMAGE PROCESSING APPARATUS AND METHOD WHICH PROCESS IMAGE ON THE BASIS OF DIRECTION OF DOCUMENT

(75) Inventors: Nobuaki Miyahara, Tokyo; Makoto Takaoka, Yokohama; Keizo Isemura, Koganei; Shigeo Fukuoka, Machida, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,416

(22) Filed: Sep. 11, 1997

(30) Foreign Application Priority Data

Sep. 19, 1996 (JP) .................................................... 8-247965
Sep. 26, 1996 (JP) .................................................... 8-254918

(51) Int. Cl.$^7$ ............................................................. G06K 9/20
(52) U.S. Cl. .............................................. 382/312; 358/1.11
(58) Field of Search ................................... 382/181, 182, 382/185, 311, 174, 312; 707/542, 529; 345/346, 467, 471, 139, 468; 412/11; 358/1.11, 1.18

(56) References Cited

U.S. PATENT DOCUMENTS

| 4,843,593 | * | 6/1989 | Yanaru et al. | 707/529 |
|---|---|---|---|---|
| 4,952,948 | * | 8/1990 | Suzuki et al. | 347/153 |
| 5,131,090 | * | 7/1992 | Fukushima | 707/542 |
| 5,255,353 | * | 10/1993 | Itoh | 345/139 |
| 5,301,036 | * | 4/1994 | Barrett et al. | 358/448 |
| 5,383,754 | * | 1/1995 | Sumida et al. | 412/11 |
| 5,799,108 | * | 8/1998 | Okahashi | 382/205 |

\* cited by examiner

*Primary Examiner*—Yon J. Couso
(74) *Attorney, Agent, or Firm*—Fitzpatrick, Cella, Harper & Scinto

(57) ABSTRACT

The direction of the document in the original image read by an image reader unit (101) is discriminated by a document direction discrimination unit (102). Rotation processing and the like are performed for the original image in accordance with the discriminated direction. The resultant image is output onto a recording paper sheet. When a fault diagnosis unit (103) diagnoses the document direction discrimination unit (102) and determines that the unit is faulty, the image processing apparatus recognizes the direction of the document in the original image on the basis of information provided from the operator through an operation unit (109), and executes the above processing.

29 Claims, 20 Drawing Sheets

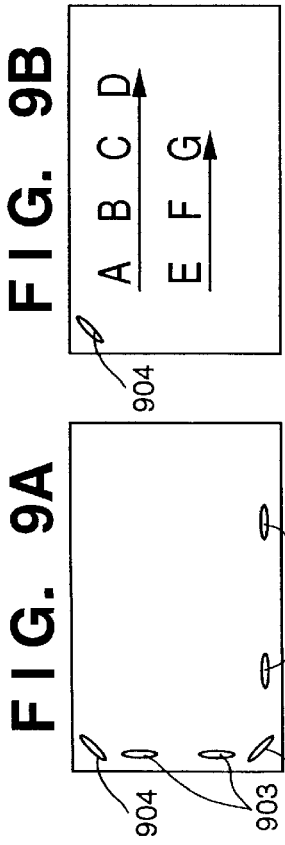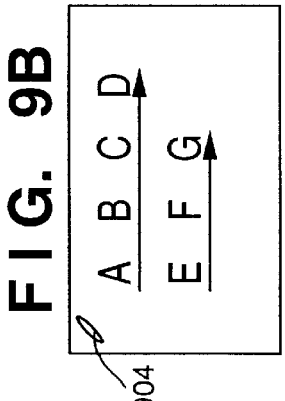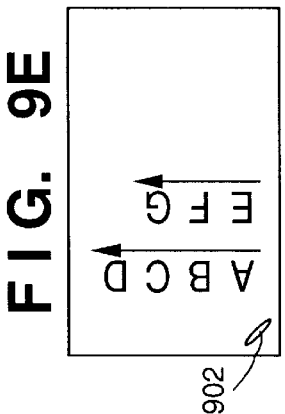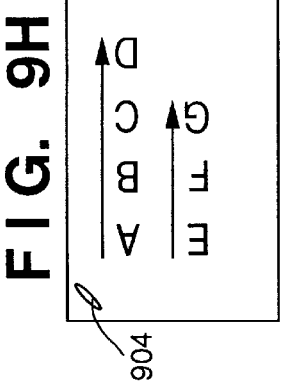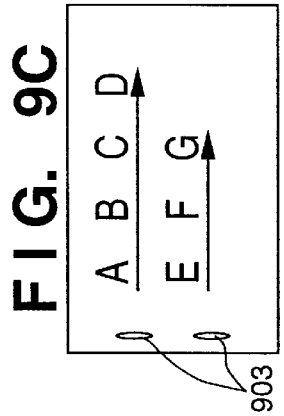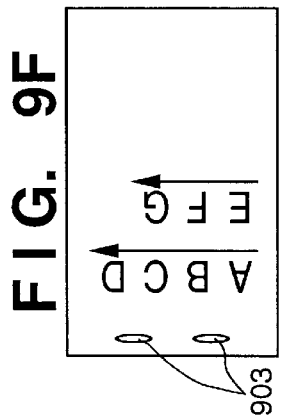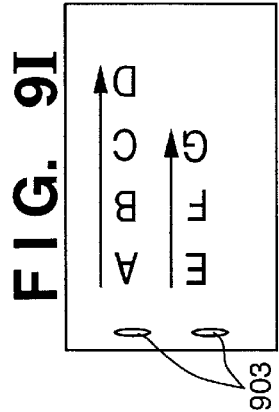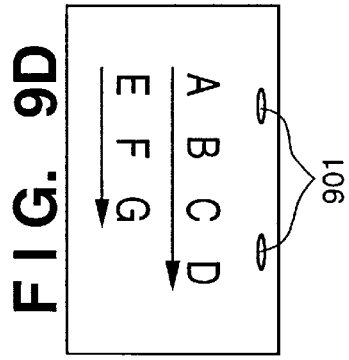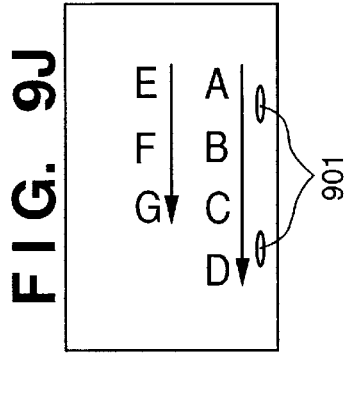

IMAGE PROCESSING APPARATUS AND METHOD WHICH PROCESS IMAGE ON THE BASIS OF DIRECTION OF DOCUMENT

BACKGROUND OF THE INVENTION

The present invention relates to an image processing apparatus and method which process an image on the basis of the document direction and, more particularly, to an image processing apparatus and method which copy an original in accordance with an instruction from an operator, and an image processing apparatus and method which process an image in a designated direction.

Some copying machines read an original image, discriminate the document direction on the basis of a characteristic image such as a character image included in the read original image, and output the original image upon rotating it in accordance with the recording paper sheet direction. For example, of the copying machines that handle recording paper sheets-in the portrait direction, some copying machines rotate a landscape original image through 90° upon reading it and output it on a recording paper sheet.

In such a copying machine, however, when the discrimination circuit for discriminating the document direction fails, the overall function of rotating a read original image and outputting it on a recording paper sheet fails. As a result, smooth copying cannot be performed.

Of copying machines without a discrimination circuit: like the one described above, some copying machines incline a character image and the like included in a read original image in a desired direction or add a shadow to such a character image and output the processed image on a recording paper sheet.

In such a copying machine, however, when a copy image with a shadow added to a character included in an original in a desired direction is to be output, the original itself must be rotated in a proper direction and placed on the document table.

SUMMARY OF THE INVENTION

It is an object of the present invention to attain image forming processing even if the function of discriminating the input image direction cannot be used.

According to the present invention, the foregoing object is attained by providing an image processing apparatus for copying an original in accordance with an instruction from an operator, comprising: input means for inputting an original image;

detection means for detecting information, from the original image, which is associated with a direction thereof; control means for, when information associated with the direction of the original image can be detected by the detection means, controlling copying on the basis of the detected information associated with the direction, and for, when information associated with the direction of the original image cannot be detected by the detection means, controlling copying on the basis of information associated with the direction and provided by the operator; and copying means for forming a copy image corresponding to the input original image under control of the control means, and discharging the copy image.

Preferably, the image processing apparatus further comprises diagnosis means for diagnosing to check whether the detection means is faulty, and wherein the control means determines, on the basis of the diagnosis result obtained by the diagnosis means, whether information associated with the direction of the original image can be detected by the detection means.

Preferably, the detection means comprises document direction detection means for detecting a direction of a document in an original image.

Preferably, the detection means comprises character recognition means for recognizing a character, and detects the direction of the document in the original image by causing the character recognition means to recognize a character in the original image.

Preferably, the detection means comprises document direction detection means for detecting a direction of a document in the original image; and original direction detection means for detecting a direction of the original.

Preferably, the document direction detection means comprises character recognition means for recognizing a character, and detects the direction of the document in the original image by causing the character recognition means to recognize a character in the original image.

Preferably, the input means inputs the original image by reading the original placed on an original table, and the original direction detection means determines the direction of the original by detecting a size of the original placed on the original table.

Preferably, the control means controls the copying means to rotate the input original image to match a direction of a recording medium, on which a copy image is to be formed, on the basis of information associated with a direction of the original image and provided from the detection means or the operator, thereby forming the copy image on the recording medium.

Preferably, the copying means comprises means for forming a copy image such that a binding margin can be added to a designated portion, of four sides of the copy image, which is designated by the operator.

Preferably, the copying means comprises means for stapling a portion, of end portions of a recording medium on which a copy image is formed, which is designated by the operator.

According to the present invention, the foregoing object is also attained by an image processing method of copying an original in accordance with an instruction from an operator, comprising: the detection step of detecting information, from an original image, which is associated with a direction thereof; and the control step of, when information associated with the direction of the original image can be detected in the detection step, controlling copying on the basis of the detected information associated with the direction, and when information associated with the direction of the original image cannot be detected in the detection step, controlling copying on the basis of information associated with the direction and provided by the operator.

According to the present invention, the foregoing object is also attained by providing a computer readable program for controlling an image processing apparatus for copying an original in accordance with an instruction from an operator, comprising: the detection step of detecting information, from an original image, which is associated with a direction thereof; and the control step of, when information associated with the direction of the original image can be detected in the detection step, controlling copying on the basis of the detected information associated with the direction, and when information associated with the direction of the original image cannot be detected in the detection step, controlling copying on the basis of information associated with the direction and provided by the operator.

It is another object of the present invention to process an input image having a document or the like printed in an arbitrary direction in accordance with the image processing direction designated with reference to a specific direction of the input image.

According to the present invention, the foregoing object is attained by providing an image processing apparatus for processing an image in a designated direction, comprising: input means for inputting an image; direction discrimination means for discriminating a direction of an input image; designation means for designating an image processing direction; and image processing means for processing the input image in a designated processing direction with reference to a proper direction of the input image.

Preferably, the direction discrimination means comprises character recognition means for recognizing a character, and discriminates a direction of the input image by causing the character recognition means to recognize a character in the input image.

Preferably, the image processing means comprises inclination means for inclining an object in the input image in a designated processing direction with reference to a proper direction of the input image.

Preferably, the image processing means comprises inclining means for inclining a character image in the input image in a designated processing direction with reference to a proper direction of the input image.

Preferably, the image processing apparatus further comprises separation means for separating a character image area from the input image, and wherein the image processing means inclines the separated character image area.

Preferably, the image processing means comprises shadow addition means for adding a shadow to an object in the input image in a designated direction with reference to a proper direction of the input image.

Preferably, the image processing means comprises shadow addition means for adding a shadow to a character image in the input image in a designated direction with reference to a proper direction of the input image.

Preferably, the image processing apparatus further comprises separation means for separating a character image area from the input image, and wherein the image processing means adds a shadow to a character image in the separated character image area.

Preferably, the image processing apparatus further comprises output means for outputting an image processed by the image processing means.

Preferably, the output means comprises means for outputting an image onto a recording medium.

According to the present invention, the foregoing object is also attained by providing an image processing method of processing an image in a designated direction, comprising: the input step of inputting an image; the direction discrimination step of discriminating a direction of the input image; the designation step of designating an image processing direction; and the image processing step of processing the input image in a designated processing direction with reference to a proper direction of the input image.

According to the present invention, the forgoing object is also attained by providing a computer readable program for performing image processing for an image in a designated direction, comprising: the input step of inputting an image; the direction discrimination step of discriminating a direction of the input image; the designation step of designating an image processing direction; and the image processing step of processing the input image in a designated processing direction with reference to a proper direction of the input image.

Further objects, features and advantages of the present invention will become apparent from the following detailed description of embodiments of the present invention with reference to the accompanying drawings.

BRIEF DESCRIPTION OF THE DRAWINGS

FIGS. 9A to 9J are views each showing the relationship between the binding position and the document direction when discharged recording paper sheets are bound together by a sorter with a stapling function;

DETAILED DESCRIPTION OF THE PREFERRED EMBODIMENTS

First Embodiment

Figure 1:
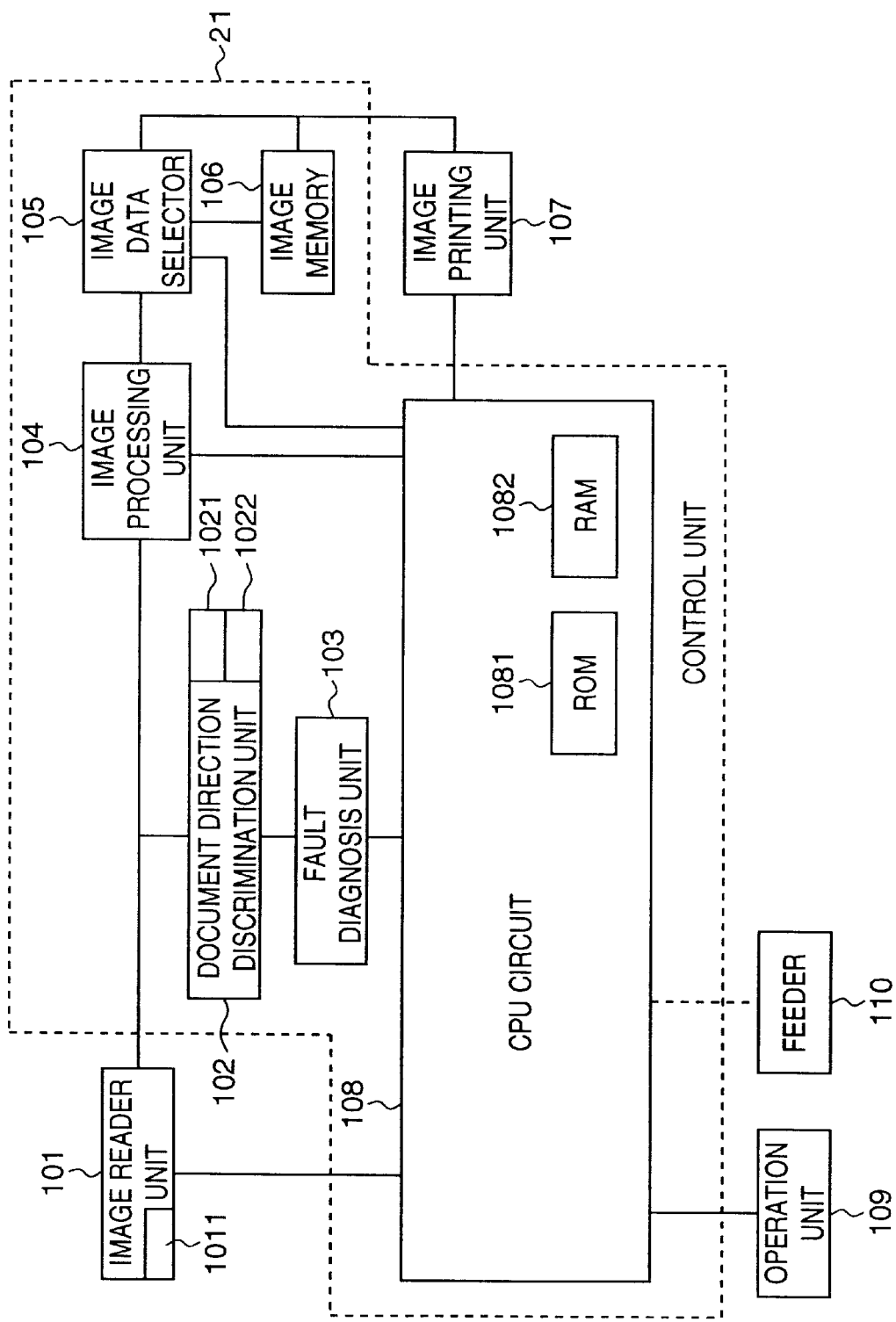
FIG. 1 is a block diagram showing the schematic arrangement of the control system of an image processing apparatus according to the first embodiment of the present invention.

FIG. 1 is a block diagram showing the schematic arrangement of the control system of an image processing apparatus as a copying/facsimile apparatus according to the first embodiment of the present invention.

An image reader unit 101 includes an optical system for optically scanning an original placed on a glass original table and focusing light reflected from the original image onto an imaging plane, a CCD for converting the focused reflected image into an analog signal, and an A/D converter for converting the analog signal received from the CCD into a digital signal. With this arrangement, the image reader unit 101 reads an original image and converts the resultant analog signal into a digital image signal to output image data associated with the read original image to a document direction discrimination unit 102 when the mode of using an automatic document direction discrimination function (to be referred to as a direction discrimination mode hereinafter) is set. The image reader unit 101 outputs this signal to an image processing unit 104 when the mode of not using the automatic discrimination function is set or automatic discrimination cannot be performed by the automatic discrimination function.

The image reader unit 101 has an original size sensor 1011 for determining the size or direction (portrait or landscape direction) of an original by using, for example, a sensor for optically detecting the size of the original placed on the original table.

The document direction discrimination unit 102 includes a document direction discrimination circuit 1021, an area separation circuit, and a character recognition dictionary 1022. When the direction discrimination mode is set, the document direction discrimination unit 102 discriminates the direction of the document in an original image associated with image data supplied from the image reader unit 101.

A method of discriminating the document direction will be described below. First of all, an input image is separated into white areas each having an area equal to or larger than a predetermined area and image areas. The lines in the respective areas obtained by area separation are recognized. Each area in which lines are distributed in a specific direction, e.g., the vertical or horizontal direction, and the density of lines is equal to or higher than a predetermined level is recognized as a character area. A group of lines constituting an image in the respective character areas is recognized as a set of line segments. The concatenation of the respective line segments is then collated with the characteristic points of characters registered in the character recognition dictionary. This collation result is expressed as the probability that the character to be collated can be specified as any of the characters registered in the character recognition dictionary 1022. This collation is performed four times for each character to be collated while the character is rotated 90° at a time. The four obtained probabilities are compared with each other. The rotational angle of the character with the highest probability is determined as the image direction.

When the upper/lower side (direction) of the image is determined in this manner, horizontal or vertical writing can also be determined by determining the arrangement of characters in accordance with spacings (white areas) between lines. In addition, a portrait document with vertical/horizontal writing or a landscape document with vertical/horizontal writing can be discriminated by combining the above determination result with the determination result associated with the original size and the original direction (landscape or portrait direction) detected by the original size sensor 1011 mounted in the image reader unit 101.

A fault diagnosis unit 103 checks whether the document direction discrimination unit 102 is faulty. To check this, a logic circuit such as the document direction discrimination circuit 1021 or the area separation circuit included in the document direction discrimination unit 102 or the memory device storing the character recognition dictionary 1022 are diagnosed by, for example, supplying a specific input to it and checking whether an output obtained corresponding to the input is normal or not.

The image processing unit 104 includes a shading correction circuit, a color/density conversion circuit, an image editing circuit for editing such as magnifying processing, movement, and decoration in accordance with an instruction from the user, and the like. The image processing unit 104 corrects/edits an image supplied from the image reader unit 101 and outputs the resultant data to an image printing unit 107 or an image memory 106 through an image data selector 105.

The image data selector 105 includes a circuit for switching between the path through which the data supplied from the image processing unit 104 is sent to the image printing unit 107 and the path through which the data is sent to the image memory 106 in accordance with an instruction from a CPU circuit 108. The image data selector 105 also includes a circuit for selectively outputting the image data supplied from the image processing unit 104 and the image data read out from the image memory 106 to the image printing unit 107, or synthesizing the two image data.

This image processing apparatus has the mode in which the image data obtained by reading an original is temporarily stored, the image processing unit 104 performs processing such as magnifying processing and rotation for the image data by using the image memory 106, and the resultant data is supplied to the image printing unit 107, in addition to the mode in which the image data obtained by reading an original through the image reader unit 101 is processed by the image processing unit 104, and the image data is supplied to the image printing unit 107, without performing any processing, to make a copy.

The image printing unit 107 forms a copy image by forming an image on a recording paper sheet on the basis of the image data (density values) supplied from the image data selector 105.

The CPU circuit 108 controls the overall apparatus. The CPU circuit 108 includes a ROM 1081 storing a control program, an error processing program, a layout scheme determination program, and the like, a RAM 1082 used as a work area for processing based on various programs, a timer, and the like.

An operation unit 109 includes various keys for inputting instructions associated with the contents of image editing in the image processing unit 104 and copying such as the number of copies, magnification, and setting of the automatic document direction discrimination function, a display unit for displaying the contents of the operations of the keys, the diagnosis result obtained by the fault diagnosis unit 103, and a warning for the user, and the like.

A feeder 110 feeds an original placed on the tray onto the original table when the feeder copy mode is selected. The feeder 110 also detects the number and size of originals placed thereon, and sends a signal representing the detection result to the CPU circuit 108.

Figure 2:
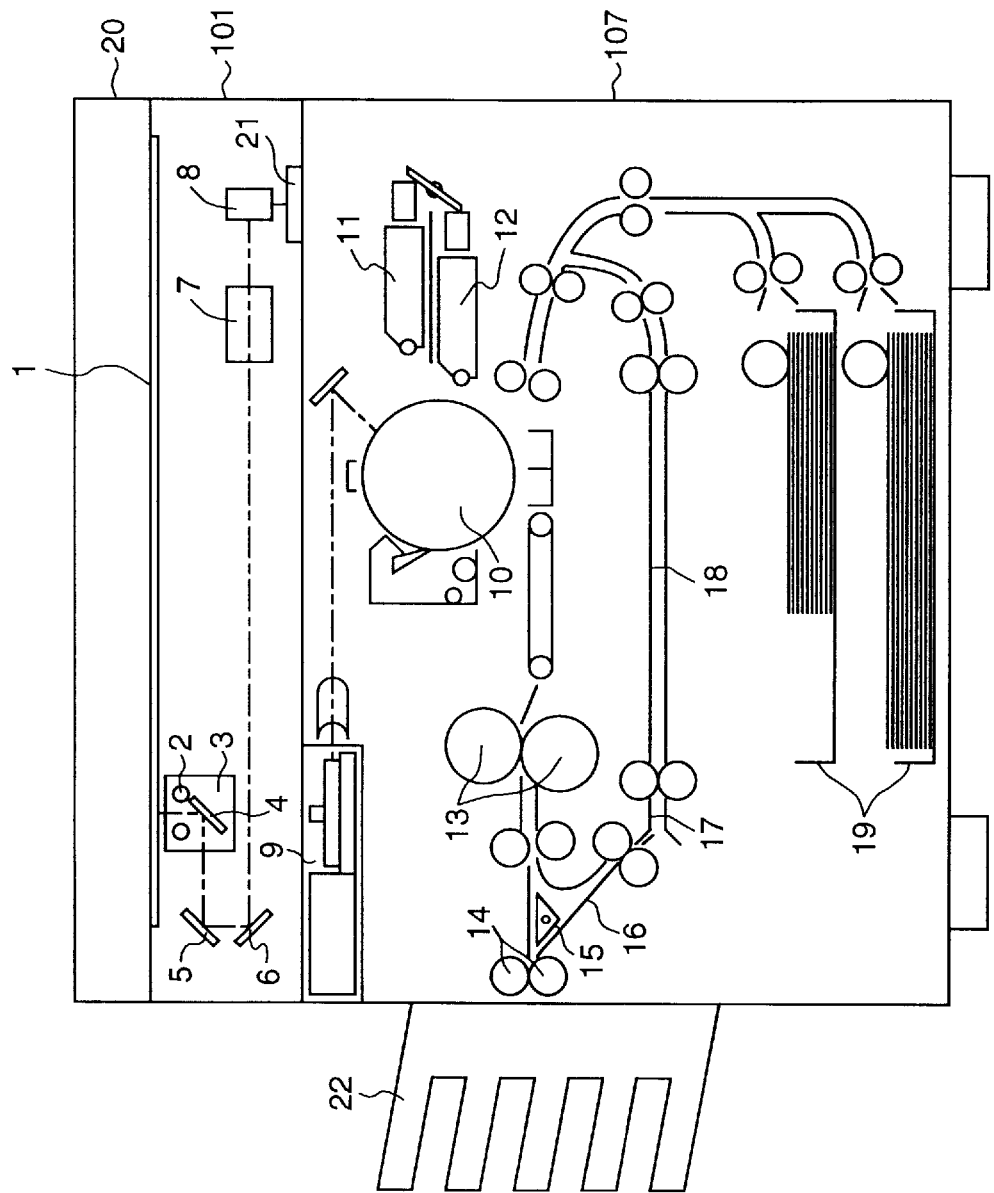
FIG. 2 is a schematic sectional view showing the mechanical arrangement of the image processing apparatus in FIG. 1.

FIG. 2 shows the mechanical arrangement of the copying/facsimile apparatus according to this embodiment. Referring to FIG. 2, when the copy start key is depressed, an original placed on the feeder 110 is fed to a predetermined position on an original table glass 1. The original on the original table glass 1 is illuminated by light from a lamp 2 which is kept on while a scanner unit 3 is driven to move. The light reflected by the original is input to an image sensor unit (CCD) 8 through mirrors 4, 5, and 6 and a lens 7. The image sensor unit 8 converts the input light reflected by the original into an analog electrical signal, and A/C-converts the signal to generate digital image data. The digital data obtained in this manner is processed by a control unit 21 whose detailed arrangement is shown in FIG. 1.

The image data output from the control unit 21 is input to an exposure control unit 9 as a component of the image printing unit 107. The exposure control unit 9 performs pulse width modulation of the image data in accordance with its density values, converts the resultant data into a light signal, and draws an image on a photosensitive member 10 on the basis of the light signal. With this operation, a latent image is formed on the photosensitive member 10.

This latent image is developed by developing units 11 and 12 to be visualized. The toner image formed in this manner is transferred onto a recording paper sheet conveyed from a paper feed unit 19. The recording paper sheet on which the toner image is transferred is subjected to a fixing process in a fixing unit 13. The resultant recording paper sheet is discharged onto a sorter 22 with a stapling function by discharge rollers 14. In the double-sided copy mode, the convey paths are switched by a flapper 15 to convey the recording paper sheet to convey paths 16, 17, and 18 for a double-sided copy operation. As a result, the above process of forming a latent image and developing, transferring, and fixing the image is performed for the lower surface of the sheet.

Figure 3:
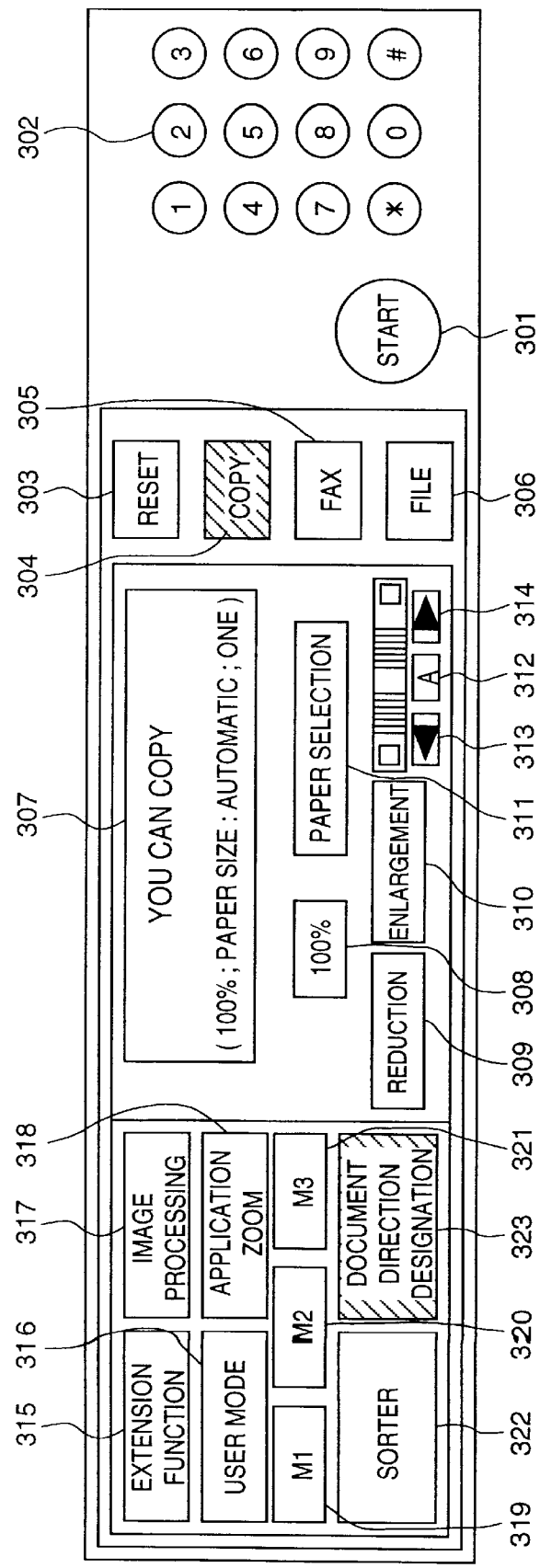
FIG. 3 is a view showing an operation unit.

FIG. 3 shows a guide screen displayed on the operation unit 109 in a normal operation. Referring to FIG. 3, reference numeral 301 denotes a start key which is used, when a copy mode is set, to actually designate the start of copying in the set mode; 302, a ten-key pad which is used to input numerical values for designating conditions such as the number of copies and a magnification; 303, a reset key which is used during a standby period to restore the apparatus to the standard mode; 304, a copy key which is used when this image processing apparatus is used as a copying machine; 305, a facsimile key which is used when the image processing apparatus is used as a facsimile apparatus; and 306, a file key which is used when the image processing apparatus is used as an image filing system.

Reference numeral 307 denotes a message display screen for displaying the status of the apparatus, the number of copies, magnification, paper size, the detailed information of a set mode, the diagnosis result associated with a fault in the document direction discrimination unit, a warning for the user, and the like; 308, a one-to-one key which is used to set a magnification of 100%; 309, a standard reduction key which is used to reduce a given standard size to another standard size; 310, a standard enlargement key which is used to enlarge a given standard size to another standard size; 311, a paper selection key which is used to select a cassette containing paper sheets used for copying; 312, an Ae key which is used to automatically adjust the copy density with respect to the density of an original; and 313 and 314, density adjustment keys. The key 313 is used to decrease the copy density. The key 314 is used to increase the copy density.

Reference numeral 315 denotes an extension function key which is used to set a copy mode such as a double-sided copy mode, a reduction layout mode, an enlargement layout mode, or a binding margin addition mode; 316, a user mode key which is used to change settings such as timer and cleaning settings; 317, an image processing key which is used to set trimming, masking, or the like; 318, an application zoom key which is used to set an entire surface image magnification, X and Y independent magnifications, or the like; 319, 320, and 321, mode memory keys which are used to register a set copy mode and invoke a registered copy mode; 322, a sort key which is used to sort, staple/sort, or the like; and 323, a document direction designating key which is used to set the automatic document direction discrimination function or manually input a desired document direction.

In the image processing apparatus described with reference to FIGS. 1 to 3, when an original is to be copied, the original is set on the original table glass 1, and the copy key 304 is depressed. Thereafter, the start key 301 is depressed. In this case, if the document direction discrimination unit 102 is faulty, and the fault diagnosis unit 103 determines that the automatic document direction discrimination function cannot be used, the screen shown in FIG. 4 is displayed on the operation unit 109.

Figure 4:
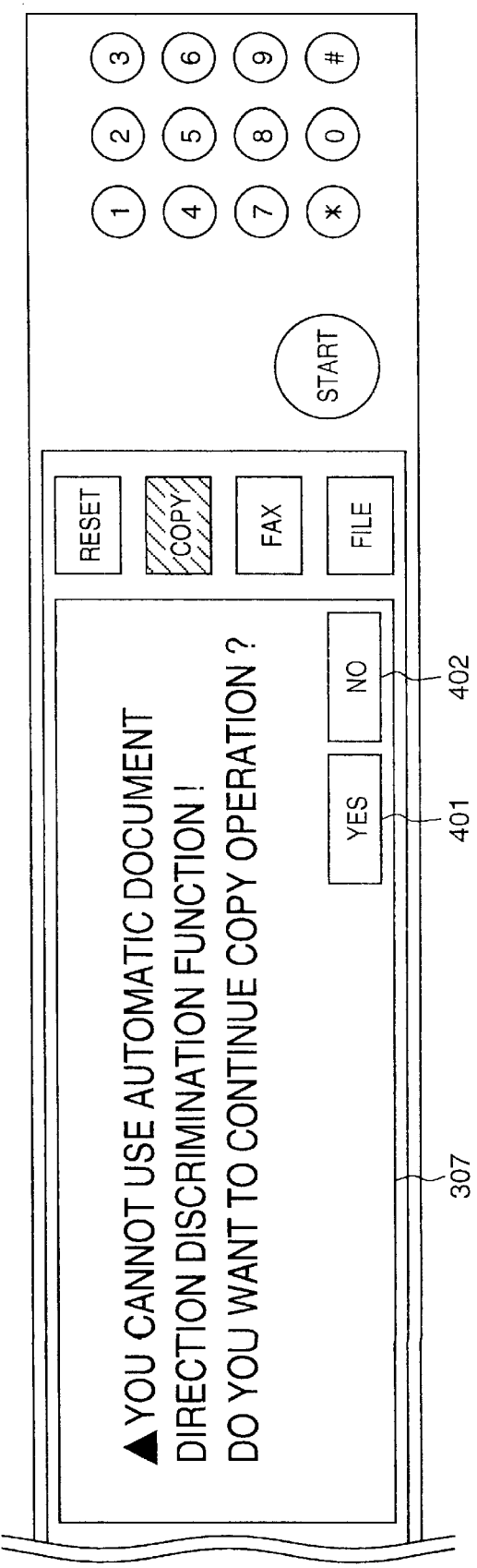
FIG. 4 is a view showing an operation unit screen displayed when an automatic document direction discrimination function cannot be used.

FIG. 4 shows the screen to be displayed on the operation unit 109 when the document direction discrimination unit 102 cannot be used because of a fault or the like. Note that this screen is displayed in a case in which the document direction cannot be discriminated owing to a problem unique to an original as well as a case in which when the mode (direction discrimination mode) using the automatic document direction discrimination function is set as a copy mode, and the start of copying is designated, the document direction discrimination unit 102 cannot be used owing to a fault or the like. If, however, a copy mode that does not use the automatic document direction discrimination function is set, this screen is not displayed.

Figure 5:
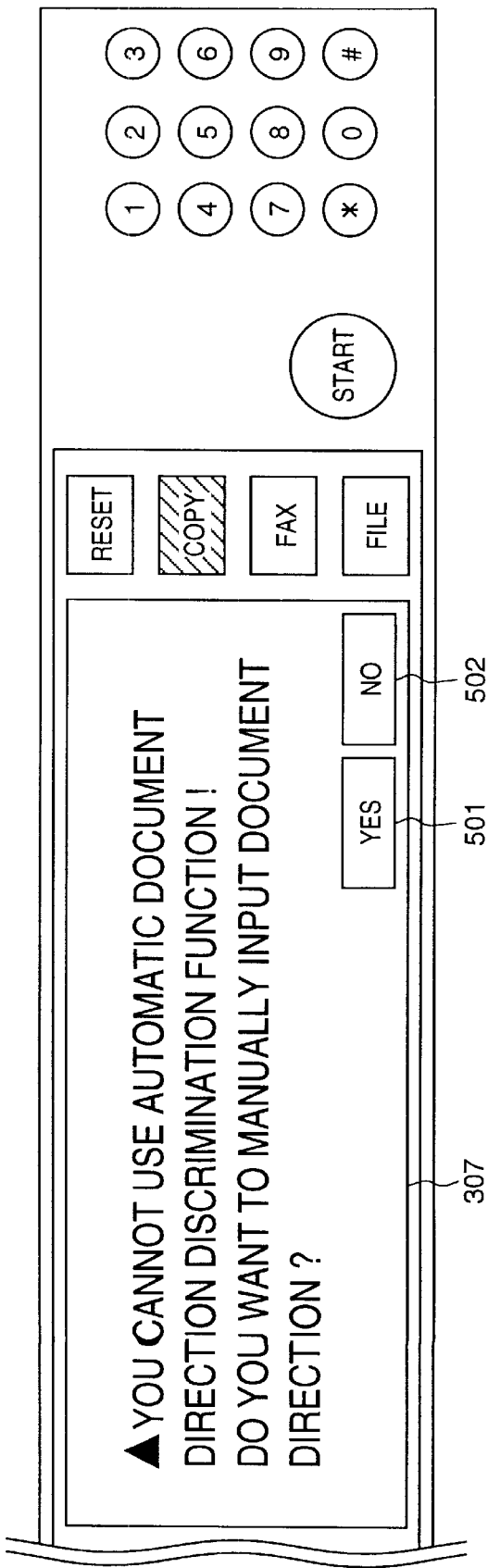
FIG. 5 is a view showing an operation unit screen for selecting the document direction manual input mode.

If a YES button 401 is selected (touched) on this screen, the screen shown in FIG. 5 is displayed. If a NO button 402 is selected, the normal screen (FIG. 3) is restored after the original is discharged onto the tray of the feeder 110.

Figure 6:
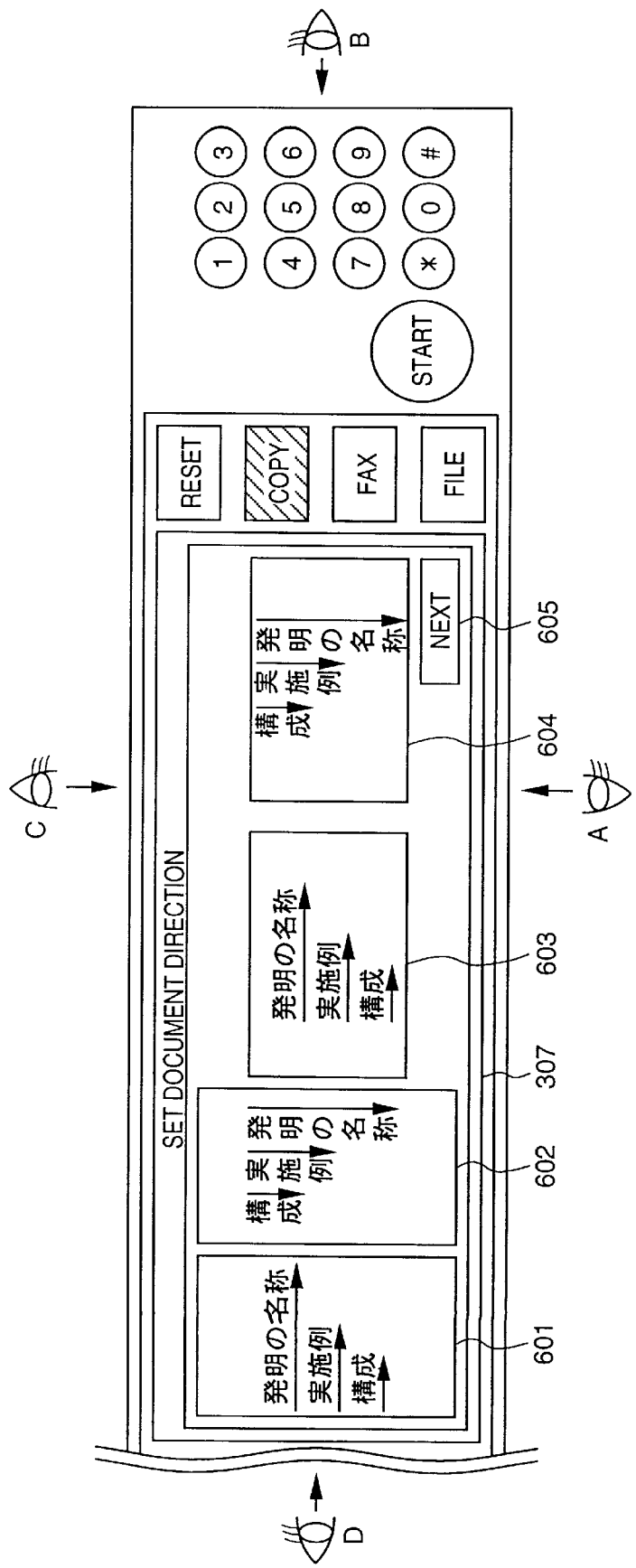
FIG. 6 is a view showing an operation unit screen displayed when a document direction is to be manually input.

The screen shown in FIG. 5 is displayed when the YES button 401 is selected on the screen shown in FIG. 4. Even if the document direction cannot be discriminated by the document direction discrimination unit 102, when it is manually determined, copying suitable for the document direction can be performed. If a YES button 501 is selected on this screen, the screen shown in FIG. 6 is displayed. If a NO button 502 is selected, the direction of the document in the original is determined to be a predetermined default document direction, and copying proceeds normally.

The screen shown in FIG. 6 is displayed when the YES button 401 is selected on the screen shown in FIG. 5. On this screen, the document directions are indicated by samples 601 to 604. When the operator manually selects (touches) one of the samples, the same effect as that obtained when the document direction discrimination unit 102 discriminates the document direction can be obtained.

The samples shown in FIG. 6 are based on Japanese documents. As the four samples which can be properly read when viewed from reference symbol A in FIG. 6, the following are shown: a portrait original with horizontal writing as the sample 601; a portrait with vertical writing as the sample 602; a landscape original with horizontal writing as the sample 603; and a landscape original with vertical writing as the sample 604.

In consideration of the directions in which the original is placed on the original table glass 1, in reality, there are documents that can be properly read when viewed from reference symbols B to D. Therefore, there are a total of 16 types of document forms on the original table glass 1. That is, when viewed from reference symbols A to D, there are a horizontally written document on a portrait original, a vertically written document on a portrait original, a horizontally written document on a landscape original, and a vertically written document on a landscape original.

In this embodiment, when a NEXT key 605 is selected (touched), the following four types of displays are switched: 1) four samples which can be properly read when viewed from "A"; 2) four samples which can be properly read when viewed from "B"; 3) four samples which can be properly read when viewed from "C"; and 4) four samples which can be properly read when viewed from "D".

When the operator selects one sample, of the 16 types of samples described above, which matches the direction (portrait or landscape direction) of the original placed on the original table glass 1 and the direction (vertically or horizontally writing; the directions A to D in which the document can be properly read) of the document, the image processing apparatus can recognize the actual directions of the original and the document.

In this case, since the original direction can be recognized by the original size sensor 1011, if only samples associated with the recognized original direction are displayed, the operator only needs to select one sample, of the eight samples, which matches the actual direction of the document.

When documents based on a language that normally allows only horizontal writing, e.g., English, are to be processed, there are four document directions: a direction in which a document can be read when viewed from "A", a direction in which a document can be read when viewed from "B", a direction in which a document can be read when viewed from "C", and a direction in which a document can be read when viewed from "D". In addition, there are two types of original directions: portrait and landscape directions.

When, therefore, only horizontally written documents using English or the like are to be processed, only eight types of samples need to be displayed on the message display screen 307. In this case, since the original direction can be recognized by the original size sensor 1011, if only samples associated with the recognized original direction are to be displayed, the operator only needs to select one sample, from four types of samples, which matches the actual document direction.

Figure 7:
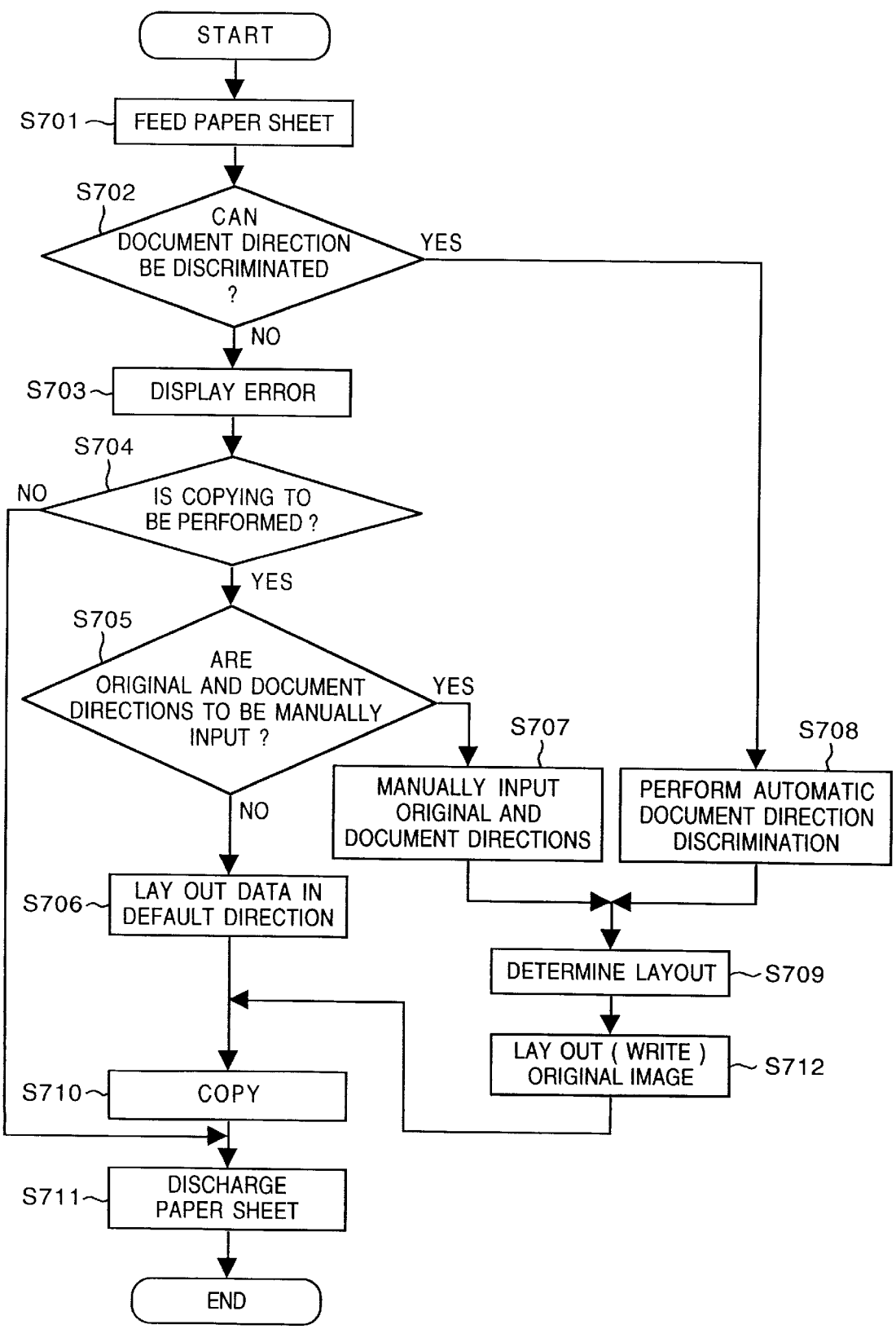
FIG. 7 is a flow chart showing the operation of the image processing apparatus in a case in which an original is copied in consideration of the original and document directions.

FIG. 7 is flow chart showing the operation of the image processing apparatus which is to be performed when an original is copied in consideration of the original direction and the document direction. This procedure is realized when the CPU circuit 108 executes programs stored in the ROM 1081.

The operator places an original on the tray of the feeder 110, and sets a copy mode by depressing the copy key 304. When the operator depresses the start key 301, the operation shown in the flow chart of FIG. 7 is started.

In step S701, the original is conveyed to a predetermined position on the original table glass 1. In step S702, the fault diagnosis unit 103 diagnoses circuits such as the automatic document direction discrimination circuit included in the document direction discrimination unit 102 to check whether the document direction discrimination unit 102 is normal, and the document direction can be actually recognized. If the document direction can be recognized, the flow advances to step S708. If the document direction discrimination unit 102 cannot be used because of a fault or the like, or the document direction cannot be recognized because of a problem unique to that original, the flow advances to step S703.

In step S703, the screen shown in FIG. 4 is displayed to indicate that the automatic document direction discrimination function cannot be currently used and to ask if the operator wants to proceed with copying. The flow then advances to step S704.

If it is determined in step S704 that copying is to continue, i.e., the YES button 401 in FIG. 4 is depressed, the flow advances to step S705. If it is determined in step S704 that copying is not to continue, i.e., the NO button 402 is depressed, the flow advances to step S711.

In step S705, the screen shown in FIG. 5 is displayed to make the user select whether to manually input the original and document directions. If the user selects to manually input the document direction, i.e., the YES button 501 in FIG. 5 is depressed, the flow advances to step S707. If the user does not select to manually input the document direction, i.e., the NO button 502 is depressed, the flow advances to step S706.

In step S706, the original image read by the image reader unit 101 is written in the image memory 106 in a predetermined default direction, and the flow advances to step S710. In this case, in the simplest case, for example, the read original image is stored in the image memory 106 with the upper direction remaining the same.

In step S707, the screen shown in FIG. 6 is displayed to make the operator manually select a sample so as to recognize the original and document directions. The flow then advances to step S709.

In step S708, the original and document directions are recognized on the basis of the discrimination results obtained by the document direction discrimination unit 102 and the original size sensor 1011. The flow then advances to step S709.

In step S709, a layout method for the original image with respect to the output image area of the image memory 106 is determined on the basis of the original and document directions recognized in steps S707 and S708 and conditions associated with copying (e.g., magnification, binding margin, stapling, and the size of a recording paper sheet). The flow advances to step S712. In this case, the output image area is an area for generating image data to be finally output to the image printing unit 107. In other words, when the image data is completely written in the output image area, the image data is read out from the output image area in a predetermined order to be supplied to the image printing unit 107, thereby forming a latent image on the photosensitive member 10 at a desired position in a desired direction.

In step S712, the original image is written in the output image area of the image memory 106 in accordance with the layout method determined in step S709. In this case, the layout method includes a method of writing the original image in the output image area without rotating it, a method of writing the original image upon rotating it, and a method of writing the original image in the output image area after shifting it to ensure a binding margin. When the original image is to be rotated, the image is rotated through, for example, three different angles, 90°, 180°, and 270°.

Figure 8:
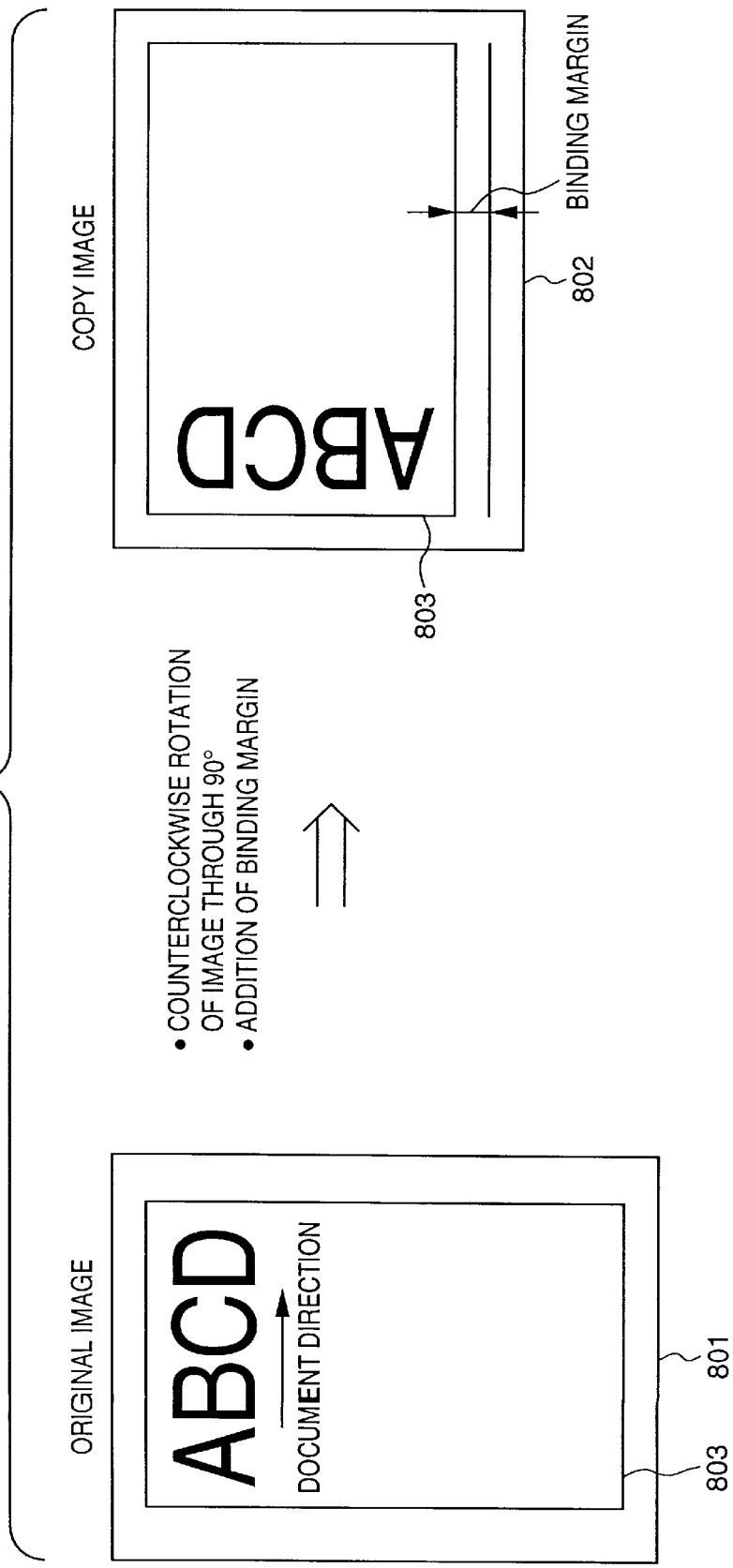
FIG. 8 is a view showing the relationship between a read original image and a copy image based on the original image.

FIG. 8 shows the relationship between a read original image and a copy image based on the original image. In this case, the mode of adding a binding margin to the left side of a document is set, and a portrait original with horizontal writing is copied. The direction (portrait direction) of an original image 801 and the document direction coincide with those of the sample 601.

In this case, a copy image 802 can be obtained by rotating the original image 801 through 90° counterclockwise, and generating an image on the image memory 106 with a binding margin being added to the left side of a document area 803.

FIGS. 9A to 9J are views each showing the relationship between the binding position and the document direction in a case in which discharged recording paper sheets are to be bound together by the sorter 22. FIG. 9A shows positions where recording paper sheets can be bound together by the sorter 22. Assume that the sorter 22 can bind recording paper sheets discharged from the image printing unit 107 in the same direction (portrait or landscape direction) at any of binding positions 901 to 904.

The arrows in FIGS. 9B to 9J indicate the directions in which character groups "A" to "G" are read in the order of "A", "B", "C", . . . , i.e., the directions in which the document is read. As shown in FIGS. 9B to 9J, a read original image must be properly rotated and supplied to the image printing unit 107 by using the image memory 106 in accordance with the document direction (the document direction include the direction in which the document is read and the portrait or landscape direction).

In step S712, the read original image must be rotated, as needed, in consideration of the relationship between the direction in which the original is placed, the document direction, and the direction in which a recording paper sheet is handled in the image printing unit 107. In this case, the direction in which the original is placed is a direction in which the document can be properly read when the original is viewed from any of the directions A to D in FIG. 6.

In step S710, the image data generated in the output image area of the image memory 106 in step S712 is sent to the image printing unit 107 to form a copy image on the recording paper sheet, and the sheet is discharged onto the sorter 22 with a stapling function. The flow then advances to step S711. In this case, if a stapling instruction is received from the control unit 21, the sorter 22 with a stapling function binds recording paper sheets in accordance with the contents of the instruction.

In step S711, the original on the original table glass 1 is discharged onto the tray of the feeder 110, and copying is ended.

With the above procedure, even if the document direction cannot be automatically discriminated by the document direction discrimination unit 102, since the operator can input the document direction, a situation in which the image processing apparatus cannot be used can be prevented, and the image processing apparatus can be used within an effective function range.

Second Embodiment

Figure 10:
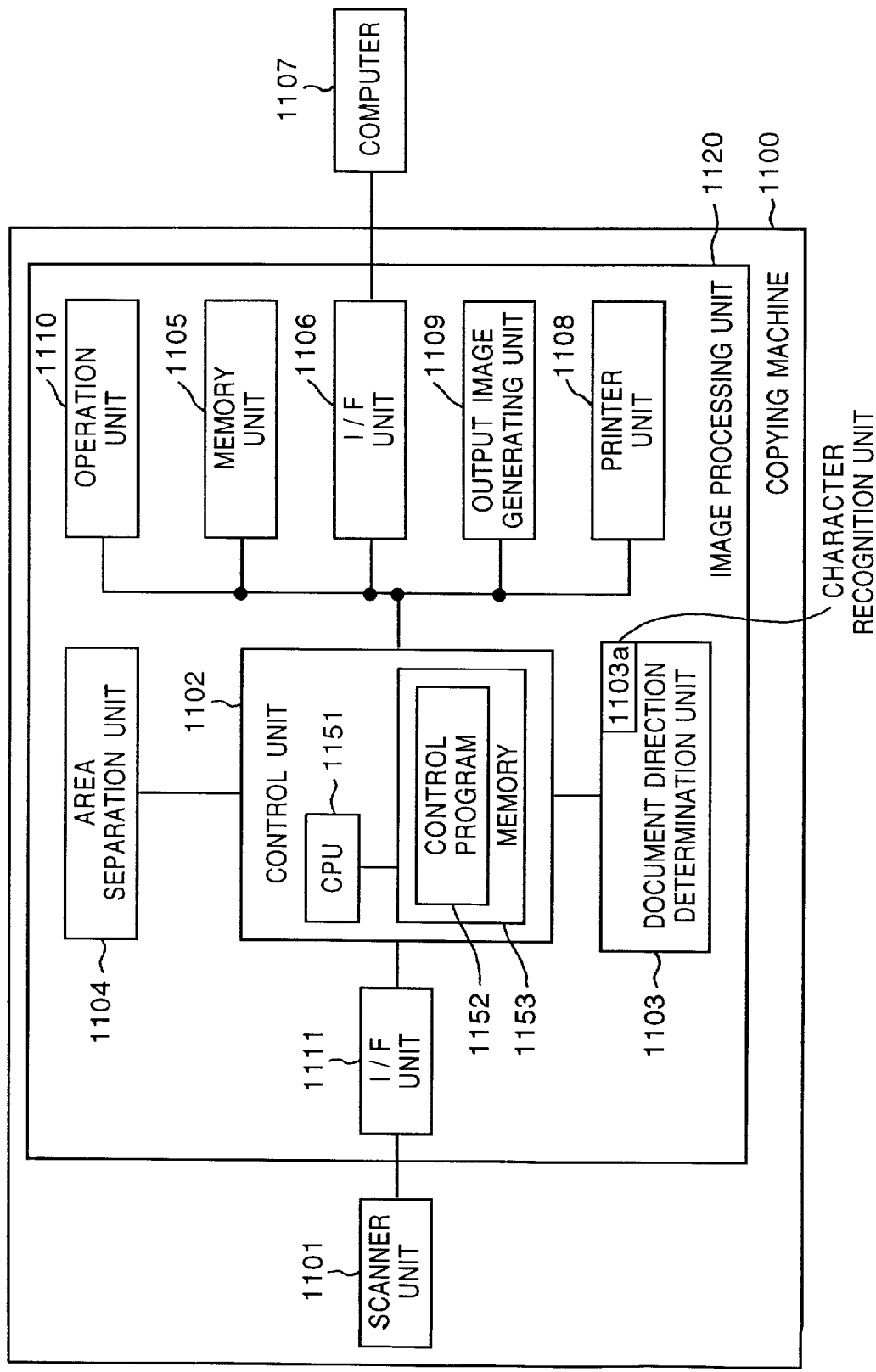
FIG. 10 is a block diagram showing the arrangement of an image processing apparatus as a copying machine according to the second embodiment of the present invention.

FIG. 10 is a block diagram showing the arrangement of an image processing apparatus as a copying machine according to the second embodiment of the present invention. A copying machine 1100 according to this embodiment discriminates the document direction, and performs designated image processing (e.g., shadow addition processing or inclined character processing) with reference to a proper document direction.

The copying machine 1100 includes a scanner unit 1101 as an image input unit, an image processing unit 1120 for generating an output image by processing an input image, and a printer unit 1108 as an image output unit.

The image processing unit 1120 includes an interface unit (I/F unit) 1111 for receiving an original image from the scanner unit 1101, an area separation unit 1104 for separating the original image (input image) into, for example, character, graphic pattern, picture, and table areas, a document direction determination unit 1103 for recognizing characters and discriminating the document direction, an output image generating unit 1109 for generating an output image by performing image processing such as shadow addition processing or inclined character processing for characters of the original image (input image), a memory unit 1105 for holding data associated image processing and the like, an interface (I/F unit) 1106 for connecting this apparatus to a computer 1107 or the like as an external device, an operation unit 1110 for inputting instructions associated with the operation modes to be set in the copying machine 1100, image processing, and the like, and displaying the contents set in the copying machine 1100, and a control unit 1102 for integrally controlling the respective blocks.

Note that the scanner unit 1101, the image processing unit 1120, and the printer unit 1108 may be separately arranged, or integrated into one unit, as shown in FIG. 10. Alternatively, the computer 1107 may be used as an image input and/or an output device.

The scanner unit 1101 optically reads an original, photoelectrically converts the read original image, and inputs the resultant data as digital image data to the image processing unit 1120. If, for example, an automatic feeder is attached to the scanner unit 1101, a plurality of originals can be continuously read.

The control unit 1102 includes a CPU 1151, a control program 1153, and a memory 1152. The control unit 1102 causes the CPU 1151 to operate on the basis of the control program 1153, thereby controlling the operation of the copying machine 1100.

The document direction determination unit 1103 includes a character recognition unit 1103a, and executes recognition processing for a character in the character area of the original image from four directions of 0°, 90°, 180°, and 270° with reference to, for example, one side of the original table as a reference (reference direction), thereby discriminating the document direction by searching for the direction in which the character recognition precision (character recognition probability: the distance from the character feature distribution) is highest. This discrimination result is provided as information indicating a specific one of angles, 0° (lower side), 90° (right side), 180° (upper side), and 270° (left side), with respect to the lower side (front surface) of the original table, at which the lower side of the document, viewed in a proper direction, is located.

The area separation unit 1104 performs pre-processing before the document direction determination unit 1103 performs document direction discrimination processing. More specifically, the area separation unit 1104 separates the input image (original image) into rectangular areas as character, graphic pattern, picture, and table areas and the like, and adds attributes (e.g., information indicating that a given area is a character area) to the respective areas. This area separation processing can be performed on the basis of, for example, the frequency and density of black pixels in the area of interest, a change in density, and the distribution of black pixels.

The memory unit 1105 includes a hard disk, a magneto optical disk, or the like, and is used to store various processing results (image data, area separation results, character recognition results, and the like).

The I/F unit 1106 includes, for example, a SCSI or RS232C, and is used to transmit/receiver data to/from an external unit (e.g., the computer 1107).

The computer 1107 is connected to the copying machine 1100 through the I/F unit 1106, and serves as an image input and/or output unit or a host control unit for the copying machine 1100.

The operation unit 1110 serves as a user interface for inputting instructions associated with the operation modes to be set in the copying machine 1100, image processing, and the like and displaying the setting contents n the copying machine 1100. The user can set the shadow adding processing direction, inclined character processing direction, or the like by operating the copying machine 1100.

The output image generating unit 1109 generates an output image by performing inclined character processing, shadow addition processing, and the like with respect to the input image data. More specifically, the output image generating unit 1109 generates an output image by performing shadow addition processing, inclined character processing, and the like in designated directions with reference to the document direction discriminated by the document direction determination unit 1103 on the basis of the image in the character area recognized by the area separation unit 1104.

The printer unit 1108 prints the image generated by the output image generating unit 1109 on a recording medium (e.g., a recording paper sheet). As an image forming scheme, for example, an electrophotographic scheme or an ink-jet scheme is suitably used. However, another scheme may be used.

Figure 11:
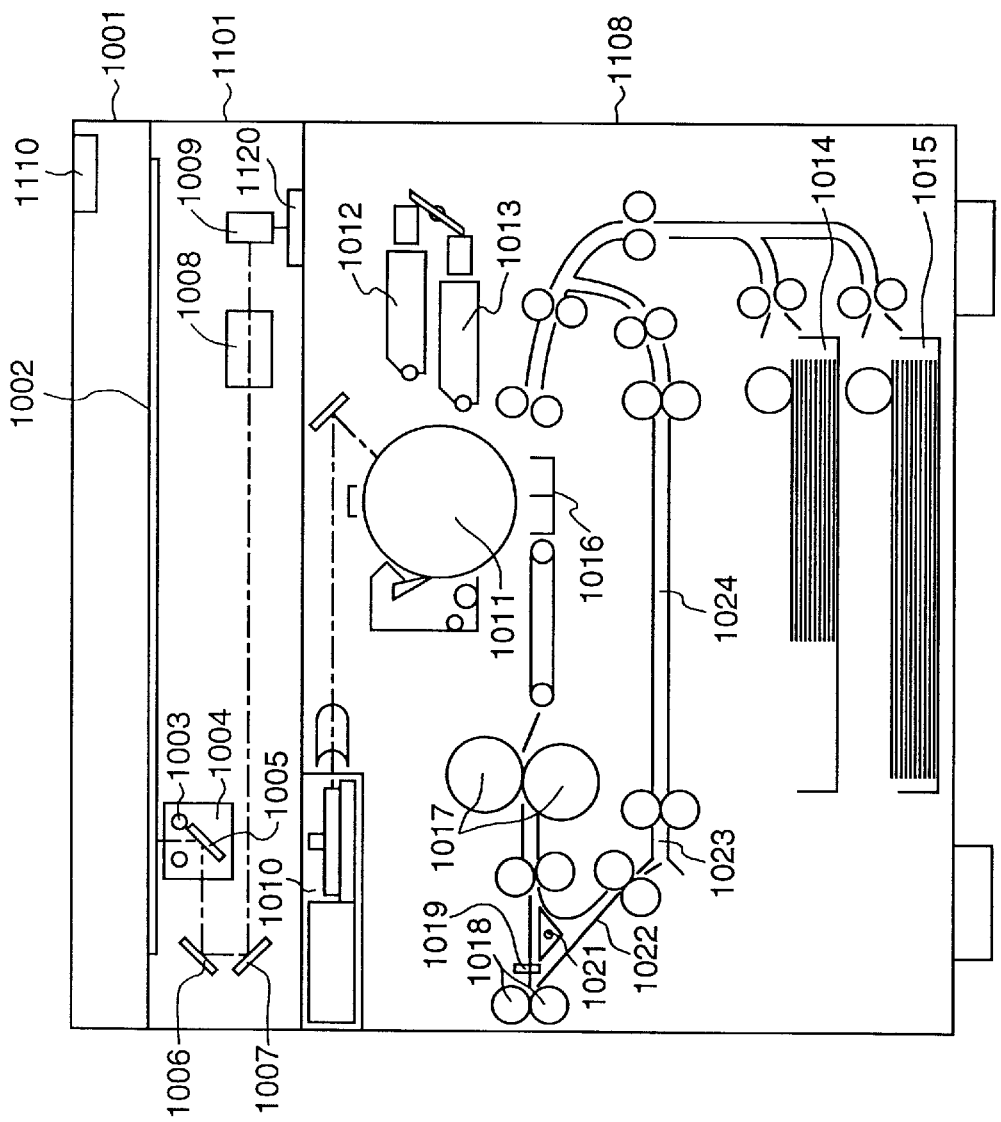
FIG. 11 is a schematic sectional view showing the mechanical arrangement of the image processing apparatus in FIG. 10.

FIG. 11 is a schematic sectional view showing the mechanical arrangement of the copying machine 1100. Referring to FIG. 11, when a copy start key is depressed, an original placed on a feeder 1001 is fed to a predetermined position on a original table glass 1002. The original is scanned by moving a scanner unit 1004 while a lamp 1003 for illuminating an original is kept on. The light reflected by the original is reflected by mirrors 1005, 1006, and 1007 and passes through a lens 1008 to be input to an image sensor 1009. The image sensor 1009 converts the input image into digital image data, and supplies it to the image processing unit 1120.

The image processing unit 1120 performs the above processing for the input image data to generate output image data, and supplies it to an exposure control unit 1010 of the printer unit 1108.

The exposure control unit 1010 converts the input output image data into a light signal to irradiate it onto a photosensitive drum 1011. The latent image formed on the photosensitive drum 1011 upon this irradiation is developed by a developing unit 1012 or 1013. The toner image transferred onto a transfer sheet as a recording paper sheet is fixed on the transfer sheet by a fixing unit 1017. Thereafter, the transfer sheet is discharged out of the copying machine 1100 by a paper discharge unit 1018. In the double-sided copy mode, the convey paths are switched by a flapper 1020 to convey the transfer sheet to double-sided convey paths 1022, 1023, and 1024.

Figure 12:
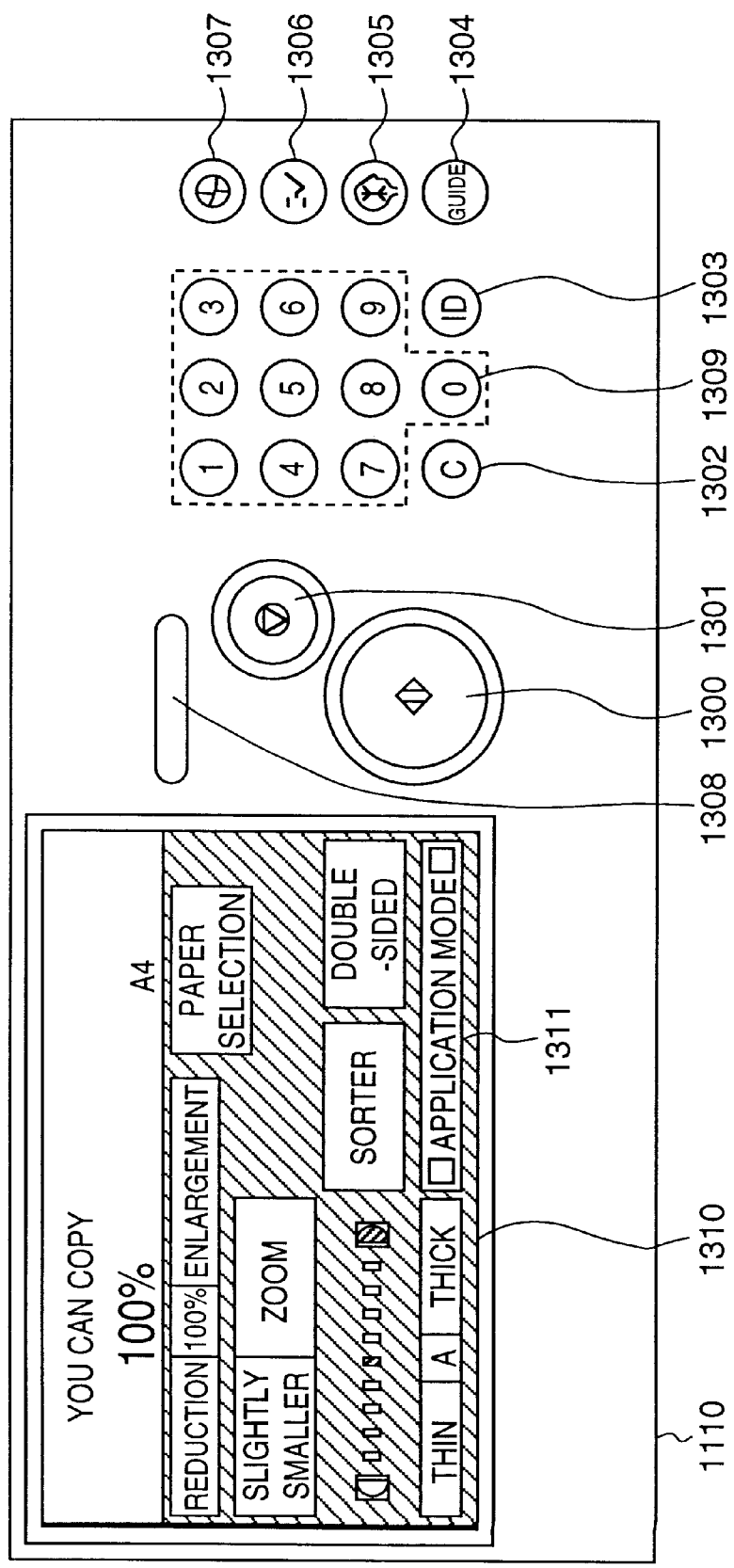
FIG. 12 is a view showing an example of the arrangement of an operation unit.

FIG. 12 shows an example of the arrangement of the operation unit 1110. Referring to FIG. 12, reference numeral 1300 denotes a start key for designating the start of copying; 1301, a stop key for designating the forced end of copying; and 1302, a clear key which is used to clear numerical values.

Reference numeral 1303 denotes an ID key which is used to input an ID so as to allow a specific operator to make copies and inhibit others from making copies; 1304, a guide key which is operated by the operator to know the functions of the copying machine 1100; and 1305, a user mode key which is used to set a function (user mode) in the copying machine 1100. User modes include a mode of setting two types of "desired functions", a specification setting mode, a timer setting mode, an adjustment/cleaning mode, and the like.

Reference numeral 1306 denotes an interruption key which is used to execute another copy operation in the process of one copy operation; 1307, a preheat key which is used to set or cancel the pre-heat mode; 1308, a reset key which is used to reset the currently set copy mode to the standard mode; and 1309, a ten-key pad which is used to set the number of copies to be made, magnification, inclined character processing direction, and the like.

Reference numeral 1310 denotes a display unit with a touch panel, which includes a liquid crystal display unit for displaying the status of the copying machine 1100 and the set state of the copy mode, and a touch panel for inputting an instruction from the operator. The operator can input an instruction by touching a soft key displayed on the panel. The contents of the liquid crystal display change in accordance with the contents of settings.

Figure 16:
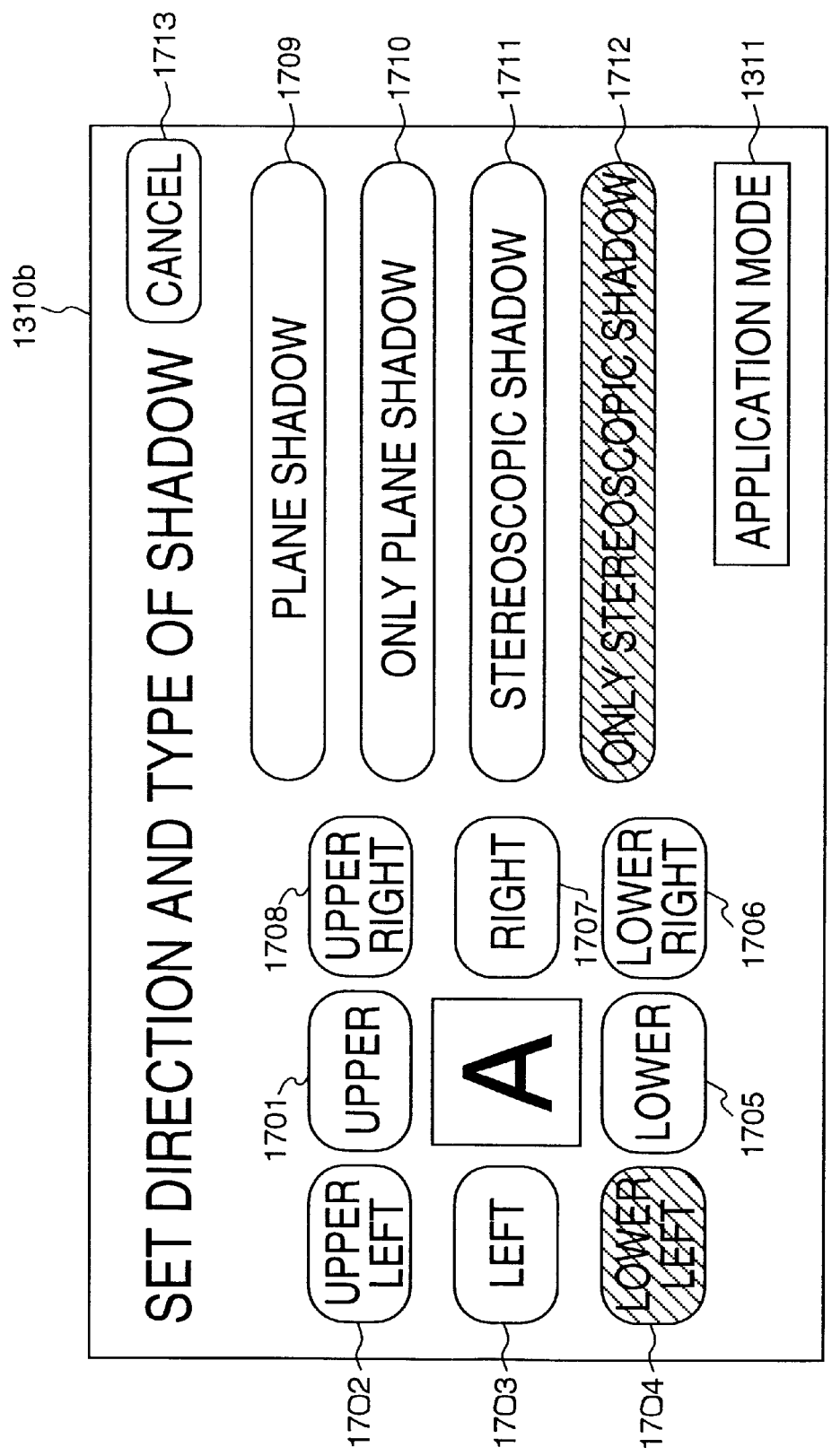
FIG. 16 is a view showing a shadow setting screen for setting conditions for shadow addition processing.

Reference numeral 1311 denotes an application mode key. Every time the application mode key 1311 is touched, application mode setting screens are switched. For example, as the application mode key 1311 is touched, a standard screen (1310) like the one shown in FIG. 12, an inclined character setting screen 1310a like the one shown in FIG. 13, and a shadow setting screen 1310b like the one shown in FIG. 16 are switched in the order named. When the application mode key 1311 is touched again, the standard screen (1310) is restored. In the sequence of switching the setting screens, for example, after the shadow setting screen 1310b, a setting screen associated with another image processing may be inserted.

Figure 14:
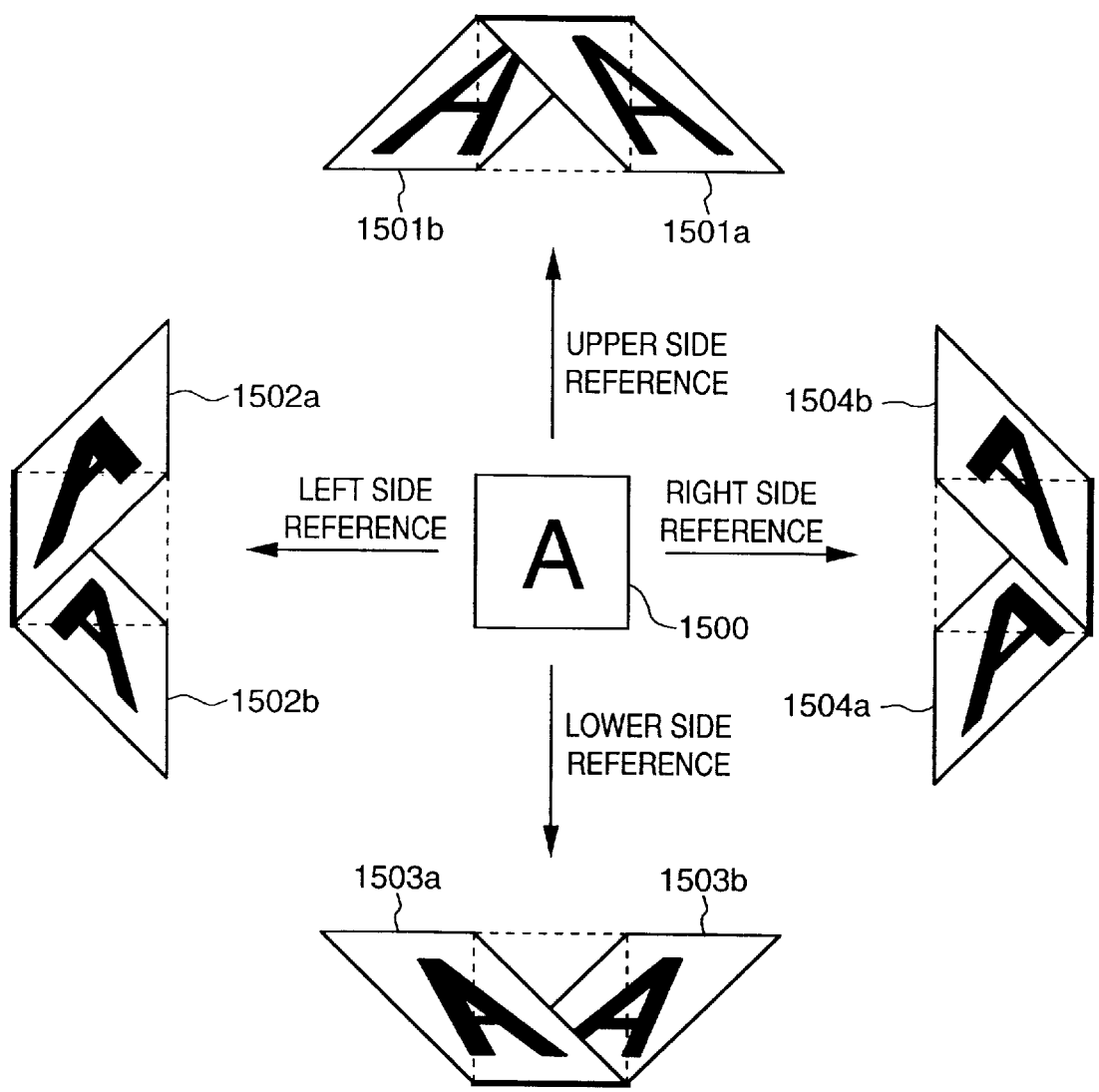
FIG. 14 is a view showing the concept of inclined character processing by taking the character "A" as an example.

FIG. 14 shows the concept of inclined character processing for the character "A" as an example. In inclined character processing in this embodiment, one of the sides (upper, lower, left, and right sides) of a rectangle surrounding the character is used as a reference, and the image in the rectangle is deformed such that the rectangle becomes a parallelogram. In this processing, the rectangular area surrounding the character can be extracted by the area separation unit 1104.

Referring to FIG. 14, reference numeral 1500 denotes a character image as an input image (original image); 1501a and 1501b, images obtained by deforming the input image 1500 such that the rectangular area of the input image 1500 becomes parallelograms-with respect to the upper side of the rectangular area of the input image 1500 as a reference; 1502a and 1502b, images obtained by deforming the input image 1500 such that the rectangular area of the input image 1500 becomes parallelograms with respect to the left side of the rectangular area of the input image 1500 as a reference; 1503a and 1503b, images obtained by deforming the input image 1500 such that the rectangular area of the input image 1500 becomes parallelograms with respect to the lower side of the rectangular area of the input image 1500 as a reference; and 1504a and 1504b, images obtained by deforming the input image 1500 such that the rectangular area of the input image 1500 becomes parallelograms with respect to the right side of the rectangular area of the input image 1500 as a reference.

Each of the images 1501*a*, 1502*a*, 1503*a*, and 1504*a* is obtained by rotating a side (to be referred to as a rotated side) that forms a vertical angle together with a side as a reference (to be referred to as a reference side) through 45° counterclockwise. Each of the images 1501*b*, 1502*b*, 1503*b*, and 1504*b* is obtained by rotating the rotated side through 45° clockwise. In the following description, the counterclockwise and clockwise directions will be referred to as the + (positive) and − (negative) directions, respectively.

As the methods of deforming (inclined character processing) a character image surrounded by a rectangle into a character image surrounded by a parallelogram, for example, the following methods are available.

According to the first method, the pixels in a rectangle are arranged in a parallelogram such that the pixels in the rectangle and the parallelogram show one-to-one correspondence.

According to the second method, when the bit map data of a character image are read out in units of rows (columns) to be written as an output image, each row (column) is shifted by dots corresponding to a length in the inclined character processing direction (angle). If, for example, the inclined character processing direction (angle) is 45°, when an output image is to be generated on the basis of a character image, each row (column) of the character image is shifted dot by dot.

Figure 13:
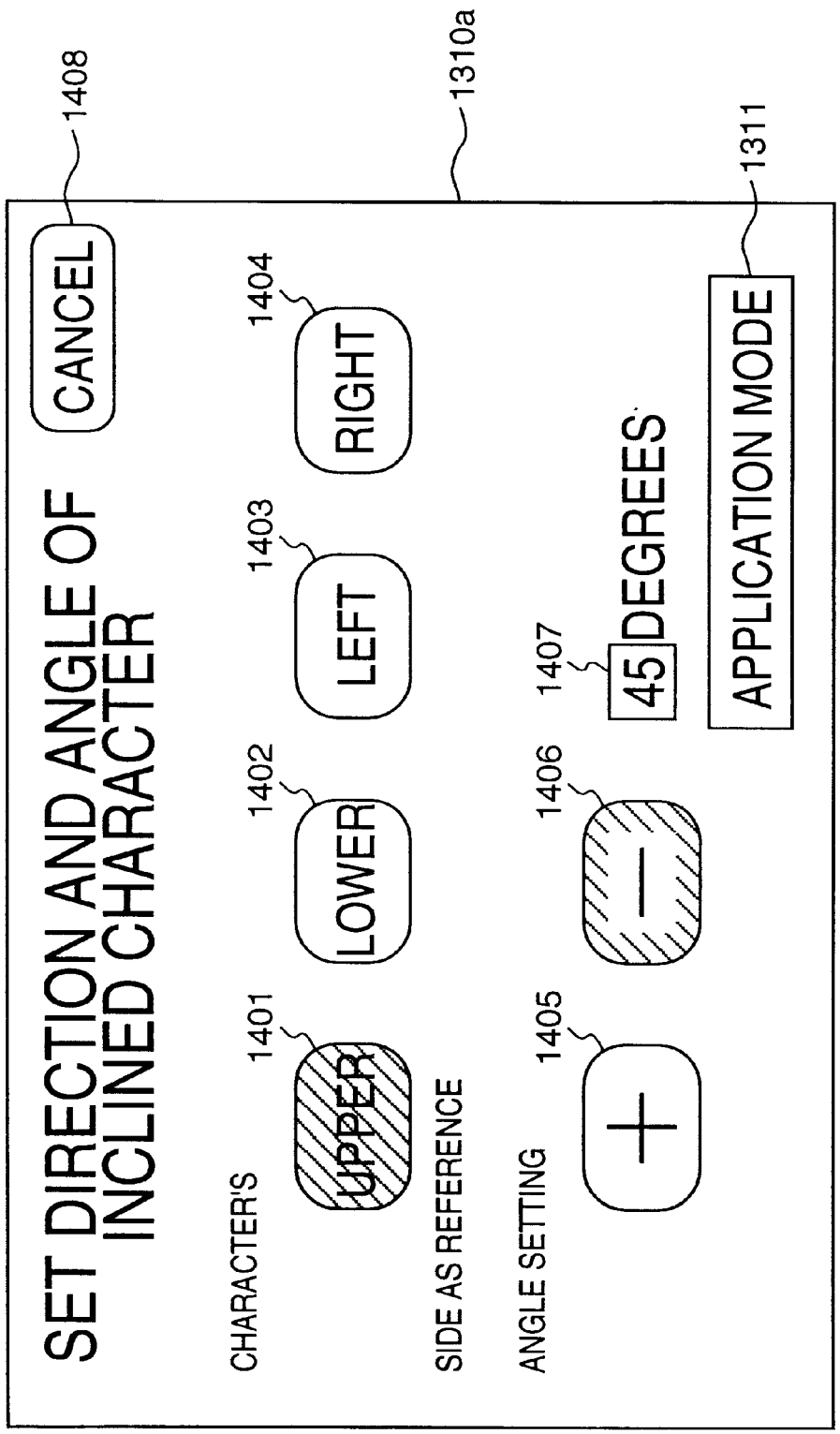
FIG. 13 is a view showing an inclined character setting screen for setting conditions for inclined character processing.

FIG. 13 shows an example of the inclined character processing screen for setting conditions for inclined character processing. Referring to FIG. 13, reference numerals 1401 to 1404 denote keys for selecting reference sides. The key 1401 is used to select the upper side as a reference side. The key 1402 is used to select the lower side as a reference side. The key 1403 is used to select the left side as a reference side. The key 1404 is used to select the right side as a reference side. The selected key is preferably displayed in a color or pattern different from that of the remaining keys to indicate that the key is selected.

Reference numeral 1405 denotes a key for selecting inclined character processing of rotating the rotated side counterclockwise; 1406, a key for selecting inclined character processing of rotating the rotated side clockwise; 1407, an area in which the inclined character processing direction (angle) input with the ten-key pad 1309 is displayed; and 1408, a key for canceling settings.

The control unit 1102 is notified of the inclined character processing conditions set on the inclined character setting screen 1310*a*.

Figure 17:
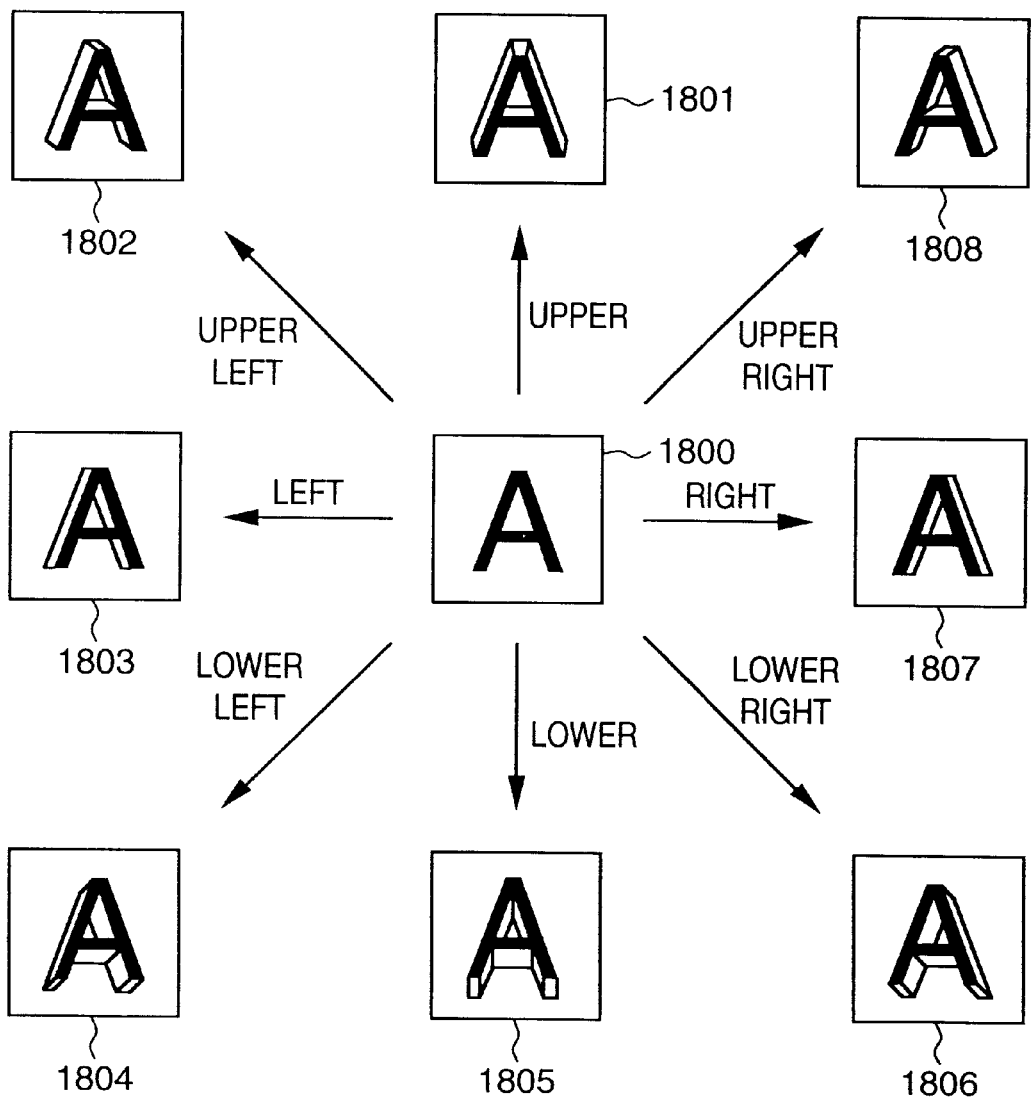
FIG. 17 is a view showing the concept of shadow addition processing by taking the character "A" as an example.

FIG. 17 shows the concept of shadow addition processing for the character "A" as an example. Reference numeral 1800 denotes a character image as an input image (original image); and 1801 to 1808, images obtained by adding shadows to the character image 1800 in the upper direction, the upper left direction, the left direction, the lower left direction, the lower direction, the lower right direction, the right direction, and the upper right direction, respectively.

As a shadow addition processing method, for example, a method of superimposing the character image 1800 and an image (having, for example, a different color or density) obtained by shifting the character image 1800 in a designated direction is available.

FIG. 16 shows an example of the shadow setting screen for setting conditions for shadow addition processing. Referring to FIG. 16, reference numerals 1701 to 1708 denote keys for setting the directions in which shadows are added to character images; 1709 to 1712, keys for selecting the types of shadows ("plane shadow", "only plane shadow", "stereoscopic shadow", and "only stereoscopic shadow"); and 1713, a key for canceling settings.

Figure 19:
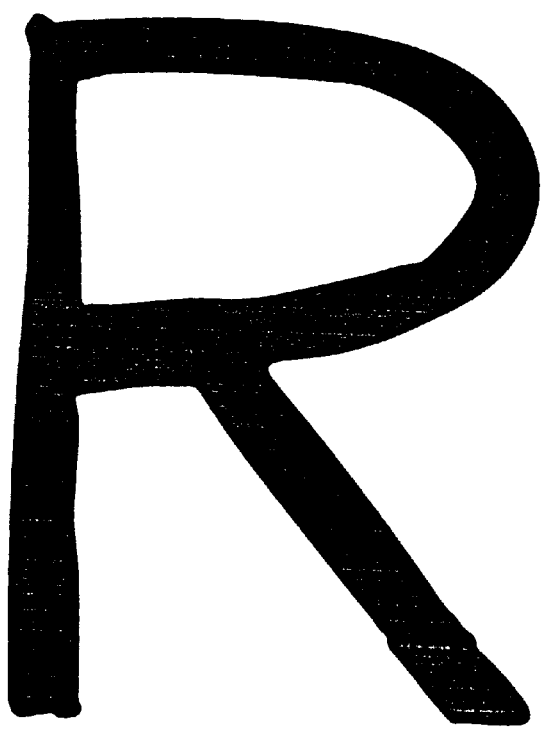
FIG. 19 is a view showing an original image to which a shadow is to be added.
Figure 20:
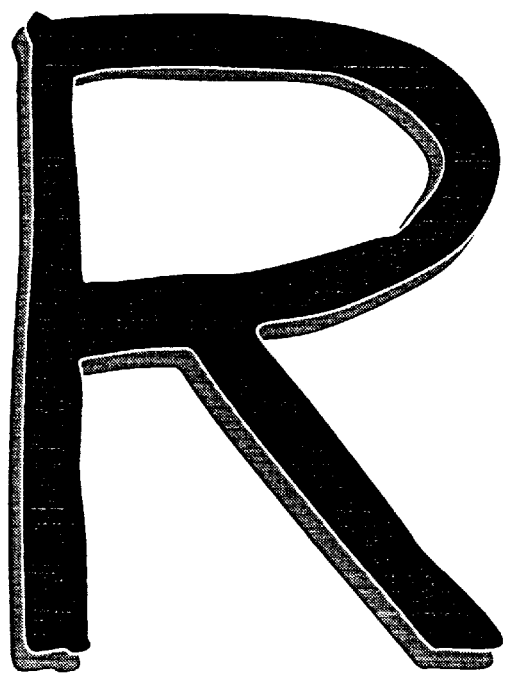
FIG. 20 is a view showing an image obtained by "plane shadow" processing for the original image.
Figure 21:
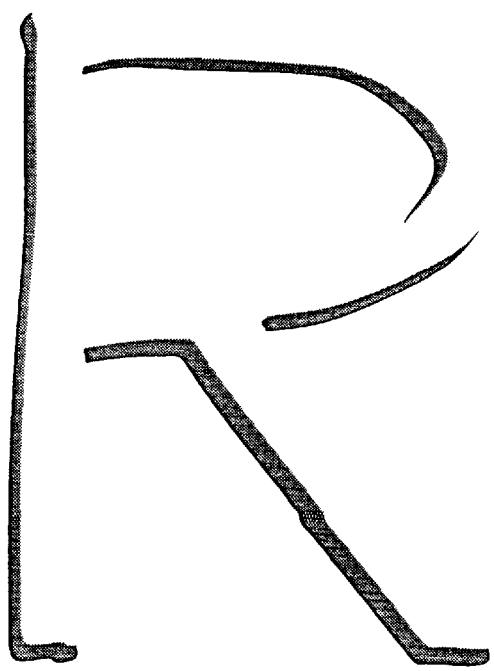
FIG. 21 is a view showing an image obtained by "only plane shadow" processing.
Figure 22:
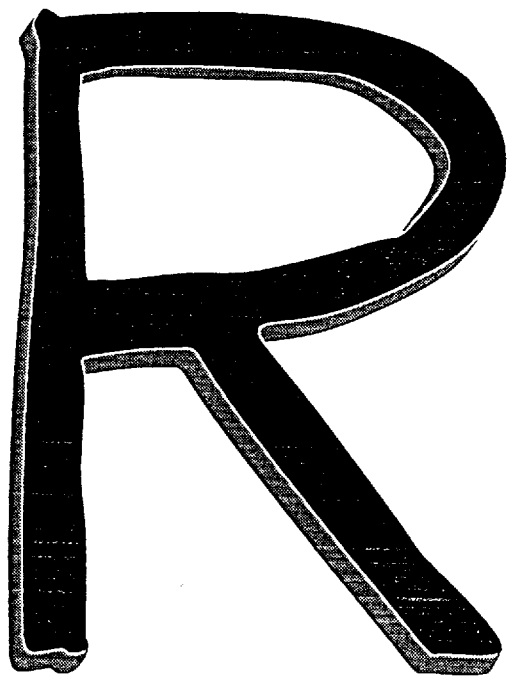
FIG. 22 is a view showing an image obtained by "stereoscopic shadow" processing for the original image.
Figure 23:
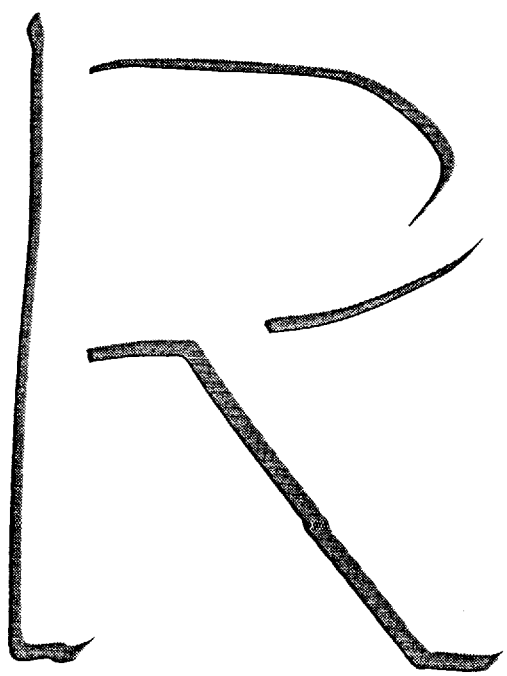
FIG. 23 is a view showing an image obtained by "only stereoscopic shadow" processing.

FIGS. 19 to 23 are views for explaining the types of shadows. FIG. 19 shows an original image to which a shadow is added. FIG. 20 shows an image obtained by "plane shadow" processing of the original image. FIG. 21 shows an image obtained by "only plane shadow" processing of the original image. FIG. 22 shows an image obtained by "stereoscopic shadow" processing of the original image. FIG. 23 shows an image obtained by "only stereoscopic shadow" processing of the original image.

As shown in FIG. 20, in "plane shadow" processing, an image having the same shape as that of the original image but having a different color or density is added as a shadow image to the original image. As shown in FIG. 21, in "only plane shadow" processing, only the shadow image in "plane shadow" processing is set as an output image. As shown in FIG. 22, in "stereoscopic shadow" processing, an image obtained by translating the original image in the shadow addition processing direction and converting the area painted upon translation of the original image into an area having a color or density different from that of the original image is added as a shadow image to the original image. As shown in FIG. 23, in "only stereoscopic shadow" processing, only the shadow image in "stereoscopic shadow" processing is set as an output image.

The control unit 1102 is notified of the shadow addition processing conditions set on the shadow setting screen 1310*b*.

Figure 15:
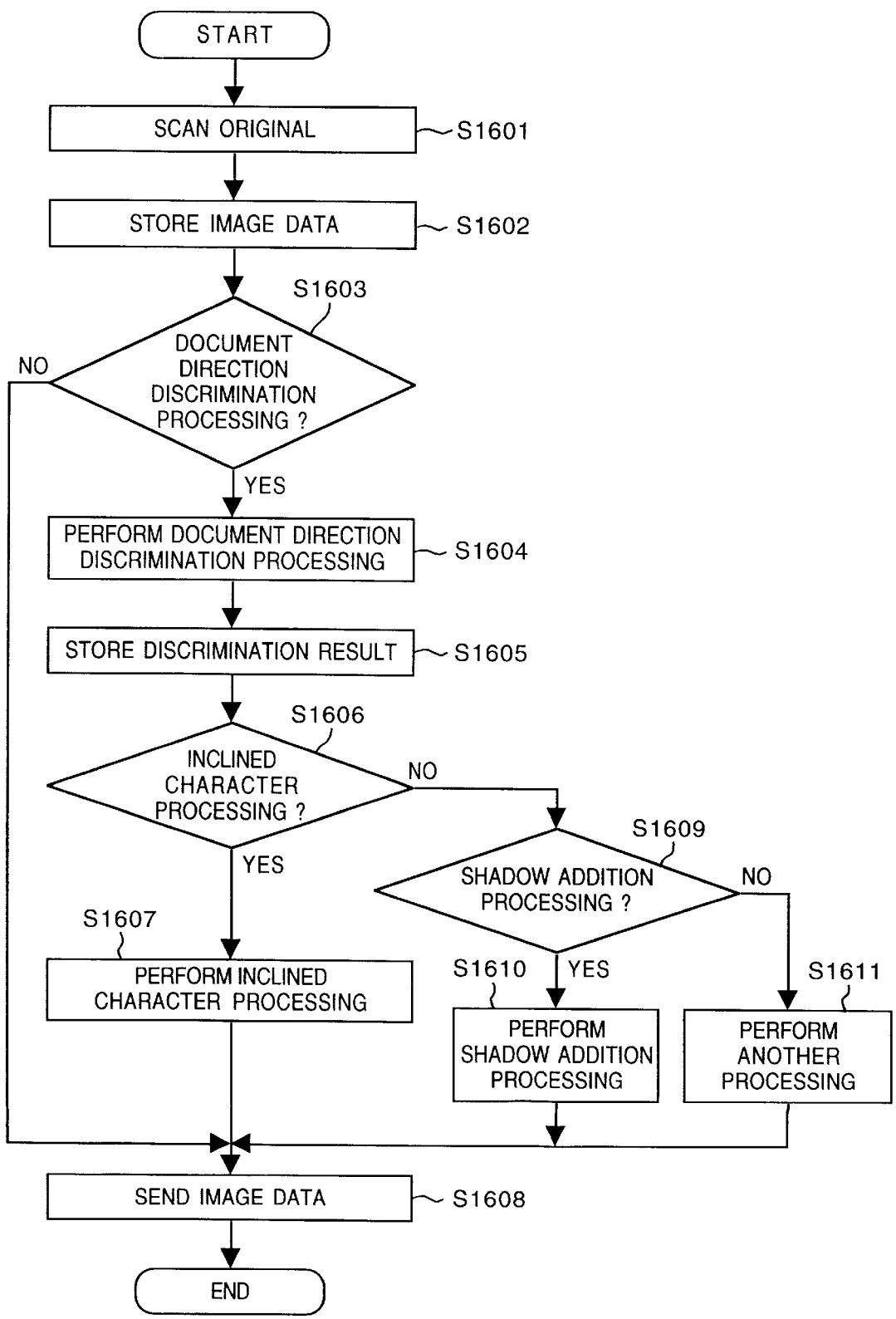
FIG. 15 is a flow chart showing a procedure for copying.

FIG. 15 is a flow chart showing a procedure for copying. This processing is controlled by the CPU 1151 on the basis of the control program 1153.

In step S1601, an original is scanned by the scanner unit 1101 to read an original image. In step S1602, the original image data is held in the memory unit 1105.

In step S1603, it is checked whether document direction discrimination processing is to be executed. If YES in step S1603, the flow advances to step S1604. If NO in step S1603, the flow advances to step S1608. For example, document direction discrimination is executed when inclined character processing or shadow addition processing is instructed.

In step S1604, the document direction is discriminated by the document direction determination unit 1103. In step S1605, the discrimination result is stored in the memory unit 1105.

In step S1606, it is checked whether the execution of inclined character processing is instructed. In step S1609, it is checked whether the execution of shadow addition processing is instructed. If inclined character processing is to be executed, the flow advances to step S1607. If shadow addition processing is to be executed, the flow advances to step S1610. If neither processing is to be executed, the flow advances to step S1611.

In step S1607, inclined character processing is executed in accordance with the set conditions. More specifically, the output image generating unit 1109 discriminates a proper document direction on the basis of the document direction discriminated by the document direction determination unit 1103, and performs inclined character processing for the image in the character area recognized by the area separation unit 1104 with reference to the proper direction in accordance with the conditions set on the inclined character setting screen 1310*a*. Assume that it is discriminated that the document of the original image is set upside down. In this case, when inclined character processing is to be performed with the upper side of the area surrounding the character serving as a reference side, the upper side of the area surrounding the character in the document in a case in which the original image is viewed from the proper direction (the direction in which the original is normally viewed when the document is read) is set as a reference side. This inclined character processing can also applied to objects other than characters.

In step S1610, shadow addition processing is executed in accordance with the set conditions. More specifically, the output image generating unit 1109 discriminates a proper document direction on the basis of the document direction discriminated by the document direction determination unit 1103, and performs shadow addition processing for the image in the character area recognized by the area separation unit 1104 with reference to the proper direction in accordance with the conditions set on the shadow setting screen 1310b. This shadow addition processing can be applied to objects other than characters.

In step S1611, a proper document direction is discriminated on the basis of the document direction discriminated by the document direction determination unit 1103, and another processing (e.g., stretching the character in a designated direction, thickening the character, or the like) is executed.

In step S1608, the output image data generated by the output image generating unit 1109 is output to the printer unit 1108.

As described above, according to this embodiment, since an image is processed in accordance with set conditions with reference to a proper direction in which the original is viewed when the document (characters) of the original is to be read, the operator can execute copying while performing image processing such as inclined character processing or shadow addition processing (image processing with a processing direction being set as a condition) without considering the direction of the original placed on the original table (however, the operator must consider the original direction limited by the original size, magnification, and the like).

In addition, according to this embodiment, since the proper direction of a document (characters) is set as a reference, a direction associated with image processing such as inclined character processing or shadow addition processing can be efficiently designated.

Note that the processing in steps S1604 to S1611 may be replaced with the processing in steps S709 and S712 in the first embodiment. In addition, steps S709 and S712 may be concurrently executed, and the processing in steps S1604 to S1611 and the processing in steps S709 and S712 may be selectively executed.

The present invention can be applied to a system constituted by a plurality of devices (e.g., host computer, interface, reader, printer) or to an apparatus comprising a signal device (e.g., copy machine, facsimile).

Further, obviously, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the present invention.

Also, the storage medium, such as a floppy disk, a hard disk, an optical disk, a magneto-optical disk, a CD-ROM, a CD-R, a magnetic tape, a non-volatile type memory card, and a ROM can be used for providing the program codes.

Furthermore, besides aforesaid functions according to the above embodiment/embodiments are realized by executing the program codes which are read by a computer, the present invention includes a case where an OS (Operating System) or the like running on the computer performs a part or entire processes in accordance with instructions of the program codes and realize functions according to the above embodiment/embodiments.

Moreover, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with instructions of the program codes and realizes functions of the above embodiment/embodiments.

Figure 18:
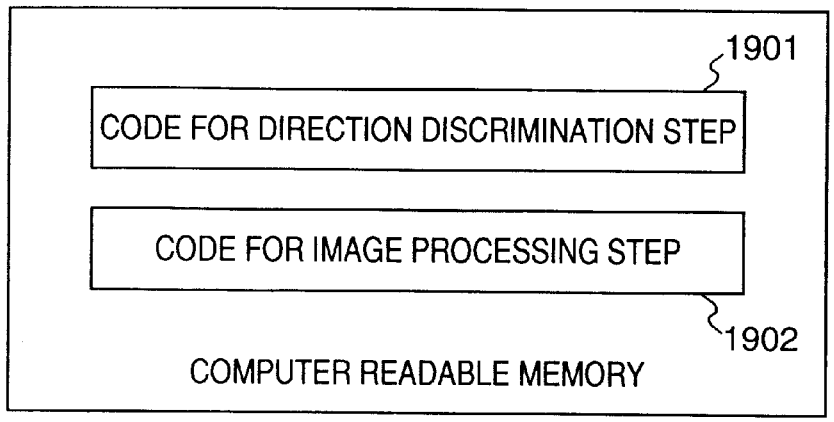
FIG. 18 is a view showing an example of the memory map of a computer readable memory according to the present invention.

FIG. 18 shows an example of the memory map of the computer readable memory according to the present invention. Referring to FIG. 18, a code 1901 for the direction discrimination step corresponds to step S1604 in FIG. 15, and a code 1902 for the image processing step corresponds to steps S1606, S1607, and S1609 to S1611 in FIG. 15.

The present invention is not limited to the above embodiments and various changes and modifications can be made within the spirit and scope of the present invention. Therefore, to apprise the public of the scope of the present invention the following claims are made.

What is claimed is:

1. An image processing apparatus for processing an image, comprising:
   an input unit adapted to input an image;
   a direction discrimination unit adapted to discriminate a character direction of the input image;
   image processing unit adapted to modify each character image in the input image in a variable modification direction specified by a user; and
   a control unit adapted to control the modification direction of the modification in said image processing unit based on the character direction discriminated by said direction discrimination unit.

2. The apparatus according to claim 1, wherein said direction discrimination unit comprises a character recognition unit adapted to recognize a character, and discriminates a character direction of the input image by causing said character recognition unit to recognize a character in the input image.

3. The apparatus according to claim 1, wherein said image processing unit comprises an inclining element adapted to incline a character image in the input image in the modification direction.

4. The apparatus according to claim 3, further comprising a separator adapted to separate a character image area from the input image, and wherein said inclining element inclines the separated character image area.

5. The apparatus according to claim 1, wherein said image processing unit comprises a stretching element adapted to stretch a character image in the input image in the modification direction.

6. The apparatus according to claim 5, further comprising a separator adapted to separate a character image area from the input image, and wherein said stretching element stretches a character image in the separated character image area.

7. The apparatus according to claim 1, further comprising an output device adapted to output an image process by said image process unit.

8. The apparatus according to claim 7, wherein said output device comprises an output element adapted to output an image onto a recording medium.

9. An image processing method of processing an image in a designated direction, comprising:

a direction discrimination step, of discriminating a character direction of an input image;

an image processing step, of modifying each character image in the input image in a variable modification direction specified by a user; and a control step, of controlling the modification direction of the modification in the image processing step based on the character direction discriminated in said direction discrimination step.

10. The method according to claim 9, wherein said direction discrimination step comprises a character recognition step, of recognizing a character, the character direction of the input image being discriminated by recognizing a character in the input image in said character recognition step.

11. The method according to claim 9, wherein said image processing step comprises an inclination step, of inclining a character image in the input image in the modification direction.

12. The method according to claim 11, further comprising a separation step of separating a character image area from the input image, and wherein said inclining step comprises inclining the separated character image area.

13. The method according to claim 9, wherein the image processing step comprises a stretching step, of stretching a character image in the input image in the modification direction.

14. The method according to claim 13, further comprising a separation step of separating a character image area form the input image, and wherein said stretching step comprises stretching a character image in the separated character image area.

15. The method according to claim 9, further comprising an output step of outputting an image processed in said image processing step.

16. The method according to claim 15, wherein said output step comprises a step of outputting an image onto a recording medium.

17. A computer readable program for controlling an image processing apparatus to perform an image processing method, said method comprising:

a direction discrimination step, of discriminating a character direction of an input image;

an image processing step, of modifying each character image in the input image in a variable modification direction specified by a user; and a control step, of controlling the modification direction of the modification in said image processing step based on the character direction discriminated in said direction discrimination step.

18. The apparatus according to claim 1, wherein said processing unit includes a copying unit adapted to form a copy image corresponding to the input original image under control of said control unit, and to discharge the copy image.

19. The method according to claim 9, wherein the processing step includes a copying step, of forming a copy image of the original image under control of said control step, and discharging the copy image.

20. The apparatus according to claim 1, wherein said image processing unit comprises a shadow addition circuit adapted to add a shadow to a character image in the input image in the modification direction.

21. The apparatus according to claim 20, further comprising a separator adapted to separate a character image area from the input image, and wherein said shadow addition element is further adapted to add a shadow to a character image in the separated image area.

22. The method according to claim 9, wherein said adding step comprises a shadow addition step, of adding a shadow to a character image in the input image in the modification direction.

23. The method according to claim 22, further comprising a separation step of separating a character image area from the input image, and wherein said shadow addition step adds a shadow to a character image in the separated image area.

24. The apparatus according to claim 1, wherein said image processing unit comprises a thickening unit, adapted to thicken a character image in the input image in the modification direction.

25. The apparatus according to claim 24, further comprising a separator adapted to separate a character image area out of the input image, and wherein said thickening unit thickens a character image in the separated character image area.

26. The apparatus according to claim 1, further comprising an instruction unit adapted to issue an instruction for the processing to be performed by said image processing unit in accordance with a manual operation, and wherein said control unit controls the modification direction based on the character direction discriminated by said direction discrimination unit and the instruction issued by said instruction unit.

27. The method according to claim 9, wherein said image processing step comprises a thickening step, of thickening a character image in the input image in the modification direction.

28. The method according to claim 27, further comprising a separation step, of separating a character image area out of the input image, and wherein said thickening step thickens a character image in the separated character image area.

29. The method according to claim 9, further comprising an instruction step, of issuing an instruction for the processing to be performed in said image processing step in accordance with a manual operation, and wherein said control step controls the modification direction based on the character direction discriminated in said direction discrimination step and the instruction issued in said instruction step.

* * * * *

UNITED STATES PATENT AND TRADEMARK OFFICE
CERTIFICATE OF CORRECTION

PATENT NO. : 6,314,213 B1
DATED : November 6, 2001
INVENTOR(S) : Nobuaki Miyahara et al.

It is certified that error appears in the above-identified patent and that said Letters Patent is hereby corrected as shown below:

Column 1,
Line 19, "sheets-in" should read -- sheets in --; and
Line 28, "circuit:" should read -- circuit --.

Column 7,
Line 62, "Ae key" should read -- AE key --.

Column 11,
Line 26, "direction" (first occurrence) should read -- directions --.

Column 12,
Line 66, "magneto" should read -- magneto --.

Column 13,
Line 13, "n" should read -- in --; and
Line 37, "a" should read -- an --.

Column 14,
Line 53, "parallelograms-with" should read -- parallelograms with --.

Column 17,
Line 7, "applied" should read -- be applied --.

Column 18,
Line 4, "are" should read -- being --;
Line 9, "realize" should read -- realizes --; and
Line 37, "image" should read -- an image --.

UNITED STATES PATENT AND TRADEMARK OFFICE
CERTIFICATE OF CORRECTION

PATENT NO.    : 6,314,213 B1
DATED         : November 6, 2001
INVENTOR(S)   : Nobuaki Miyahara et al.

It is certified that error appears in the above-identified patent and that said Letters Patent is hereby corrected as shown below:

Column 19,
Line 2, "process" should read -- processed --;
Line 32, "the" should read -- said --; and
Line 37, "form" should read -- from --.

Signed and Sealed this

Twenty-first Day of May, 2002

Attest:

Attesting Officer

JAMES E. ROGAN
Director of the United States Patent and Trademark Office